United States Patent
Takehara et al.

(10) Patent No.: US 11,034,809 B2
(45) Date of Patent: Jun. 15, 2021

(54) RESIN SUPPLY MATERIAL, PREFORM, AND METHOD OF PRODUCING FIBER-REINFORCED RESIN

(71) Applicant: Toray Industries, Inc., Tokyo (JP)

(72) Inventors: Tomohiro Takehara, Ehime (JP); Satoshi Seike, Aichi (JP); Masato Honma, Ehime (JP); Naokichi Imai, Ehime (JP); Satomi Hiasa, Ehime (JP)

(73) Assignee: Toray Industries, Inc., Tokyo (JP)

( * ) Notice: Subject to any disclaimer, the term of this patent is extended or adjusted under 35 U.S.C. 154(b) by 833 days.

(21) Appl. No.: 15/553,804

(22) PCT Filed: Feb. 24, 2016

(86) PCT No.: PCT/JP2016/055378
§ 371 (c)(1),
(2) Date: Aug. 25, 2017

(87) PCT Pub. No.: WO2016/136791
PCT Pub. Date: Sep. 1, 2016

(65) Prior Publication Data
US 2018/0244879 A1 Aug. 30, 2018

(30) Foreign Application Priority Data

Feb. 27, 2015 (JP) .............................. JP2015-037929
Feb. 27, 2015 (JP) .............................. JP2015-037932
Feb. 27, 2015 (JP) .............................. JP2015-038130

(51) Int. Cl.
*C08J 5/24* (2006.01)
*C08J 5/04* (2006.01)
(Continued)

(52) U.S. Cl.
CPC ................. *C08J 5/24* (2013.01); *B29C 70/18* (2013.01); *B29C 70/40* (2013.01); *B29C 70/465* (2013.01);
(Continued)

(58) Field of Classification Search
None
See application file for complete search history.

(56) References Cited

U.S. PATENT DOCUMENTS 5,679,042 A * 10/1997 Varona .................... D04H 3/16
156/84
2011/0143110 A1 6/2011 Tsuchiya et al.
(Continued)

FOREIGN PATENT DOCUMENTS

| CN | 103649186 | 3/2014 |
| JP | 2002-234078 A | 8/2002 |

(Continued)

OTHER PUBLICATIONS

Leone, C., Durante, M., Visconti, I. C., and Iorio, I. De, 1995, "New Resin Film Infusion Process for Manufacture of Large Composite Structures." escm.eu.org (Year: 1995).*

(Continued)

*Primary Examiner* — Matthew J Daniels
*Assistant Examiner* — Mohammad M Ameen
(74) *Attorney, Agent, or Firm* — DLA Piper LLP (US)

(57) ABSTRACT

A resin supply material used for press molding or vacuum-pressure molding of a fiber-reinforced resin, the resin supply material including a continuous porous material and a thermosetting resin, wherein an average pore cross-sectional area ratio P expressed by formula (I) is 1.1 or more:

$$P = AII/AI \qquad (I)$$

AI: average pore cross-sectional area in region I
AII: average pore cross-sectional area in region II (Continued)

Region I: region occupying 10% of total volume of continuous porous material from surface layer on both surfaces thereof Region II: whole region of continuous porous material.

18 Claims, 4 Drawing Sheets

(51) Int. Cl.
*B29C 70/18* (2006.01)
*B29C 70/54* (2006.01)
*B29C 70/46* (2006.01)
*B29C 70/40* (2006.01)
*B29K 63/00* (2006.01)
*B29K 307/04* (2006.01)

(52) U.S. Cl.
CPC ............... *B29C 70/547* (2013.01); *C08J 5/04* (2013.01); *C08J 5/042* (2013.01); *B29K 2063/00* (2013.01); *B29K 2307/04* (2013.01); *B29K 2905/00* (2013.01); *C08J 2323/12* (2013.01); *C08J 2363/02* (2013.01); *C08J 2400/20* (2013.01)

(56) References Cited

U.S. PATENT DOCUMENTS

| | | | |
|---|---|---|---|
| 2012/0012263 A1 | 1/2012 | Tsuchiya et al. | |
| 2013/0209891 A1* | 8/2013 | Neumann | H01M 4/133 429/231.8 |
| 2014/0154472 A1 | 6/2014 | Eto et al. | |

FOREIGN PATENT DOCUMENTS

| | | | |
|---|---|---|---|
| JP | 2003-011231 A | | 1/2003 |
| JP | 2003-071856 A | | 3/2003 |
| JP | 2005-022171 A | | 1/2005 |
| JP | 2006-305867 A | * | 11/2006 |
| JP | 2006-305867 A | | 11/2006 |
| JP | 2008-246981 A | | 10/2008 |
| JP | 2011-230341 A | | 11/2011 |
| JP | 2013-188953 A | | 9/2013 |
| WO | 2010/013645 A1 | | 2/2010 |

OTHER PUBLICATIONS

The First Office Action dated Oct. 30, 2019, of counterpart Chinese Application No. 201680012070.6, along with an English translation.

* cited by examiner

RESIN SUPPLY MATERIAL, PREFORM, AND METHOD OF PRODUCING FIBER-REINFORCED RESIN

TECHNICAL FIELD

This disclosure relates to a resin supply material, a preform, and a method of producing a fiber-reinforced resin.

BACKGROUND

Fiber-reinforced resins have an excellent specific strength and specific rigidity and are, therefore, widely used in applications such as aircraft, automobiles and sports. Particularly in industrial applications such as automobiles and sports, demand for high-speed molding processes for fiber-reinforced resins is growing. Meanwhile, cost reduction is strongly requested in expansion of the use of fiber-reinforced resins. One solution for this is to reduce the defective rate of products, i.e., improve the product yield, by reducing the incidence of external appearance defects of a fiber-reinforced resin such as warpage and sink marks. Thus, it has been an important technical challenge to improve product yield while selecting a high-speed molding process in development of a fiber-reinforced resin.

Methods for high-speed molding of a fiber-reinforced resin include a RTM (resin transfer molding) method (JP 2003-71856) and a RFI (resin film infusion) method (JP 2003-11231). In the RTM method, first, a dry base material (reinforcing fiber base material which does not contain a resin) is formed into a predetermined shape to produce a preform, the preform is disposed in a metal mold, and a liquid thermosetting resin having a low viscosity is injected into the metal mold, and heated and cured to mold a FRP (fiber-reinforced plastic) member. Since a dry base material is used, a three-dimensional complicated shape can be formed. In the RTM method, however, a process of injecting a resin is necessary and, therefore, molding subsidiary materials to be used in the injection process such as tubes and pipes are required. In addition, all the resin is not consumed for production of a molded article, and a large amount of the resin is wastefully left in an injection channel, resulting in an increase in cost. In a thermosetting resin, the resin cannot be reused, and cleaning in each batch requires lots of labor, resulting in an increase in cost. The RTM method also has the disadvantage that an injection port or a suction port leaves its trace on a molded member. Moreover, the RTM method has the problem that an operation site is often contaminated by a resin leaked out from a container or a pipe because a resin that is liquid at room temperature is used.

In the RFI method, a reinforcing fiber base material, and a resin film composed of an uncured thermosetting resin are disposed in a mold, and the resin film is melted by heating to be impregnated into the reinforcing fiber base material, and is then cured. Unlike the RTM method, the RFI method does not involve a thermosetting resin that is liquid at room temperature. Therefore, in the RFI method, an operation site is rarely contaminated, and time and labor for resin formulation and the like can be saved. However, the RFI method has the problem that a thermosetting resin to be used in the RFI method has low rigidity in the form of a film and is, therefore, poor in handling characteristic so that lots of time and labor are required for disposing the film in a mold.

JP 2002-234078 and JP 2006-305867 each suggest a method of molding a fiber-reinforced resin using an impregnated body (described as a resin support in JP '078 or a preform in JP '867) in which a thermosetting resin that is liquid at room temperature is absorbed into a support. JP 2008-246981 suggests a method of molding a fiber-reinforced resin using a SMC (sheet molding compound).

With the method in each of JP '078 and JP '867, a structural member can be produced by laminating an impregnated body with a dry base material, then heating and pressurizing the resulting laminate in a mold to impregnate a reinforcing fiber base material with a thermosetting resin in the impregnated body. The molding method in JP '981 is used for the purpose of obtaining a molded article with smoothed proper external appearance quality by interposing a resin-non-impregnated base material between prepreg layers to suppress generation of depressions on a surface of the molded article.

However, in JP '078, JP '867 and JP '981, the pore diameter of a support used in an impregnated body or a prepreg is large and almost uniform in the thickness direction, and therefore there is the problem that resin leakage easily occurs during conveyance. It is necessary to reduce the pore diameter to prevent resin leakage, but when the pore diameter is excessively reduced, it is difficult to store a resin in the support. The support in each of JP '078 and JP '867 is intended only for improving the handling characteristic of the impregnated body, and improvement of the product yield of the resulting fiber-reinforced resin requires further technological development. The SMC in JP '981 is a material including an unopened reinforcing fiber bundle, and has the problem that the incidence of external appearance defects of the fiber-reinforced resin such as unevenness in surface roughness and sink marks is still high. Thus, improvement of the product yield of the resulting fiber-reinforced resin requires further technological development.

It could therefore be helpful to provide a resin supply material that is excellent in resin storage characteristic and handling characteristic, and a method of producing a fiber-reinforced resin using the resin supply material.

It could also be helpful to provide a resin supply material capable of improving a handling characteristic in production of a fiber-reinforced resin, and securing both productivity and a production yield for the resulting fiber-reinforced resin, and a method of producing a fiber-reinforced resin using the resin supply material.

SUMMARY

We thus provide:

A resin supply material is used for press molding or vacuum-pressure molding of a fiber-reinforced resin, the resin supply material including a continuous porous material and a thermosetting resin, wherein an average pore cross-sectional area ratio P expressed by formula (I) is 1.1 or more.

$$P = AII/AI \quad (I)$$

AI: average pore cross-sectional area in region I
AII: average pore cross-sectional area in region II
Region I: region occupying 10% of total volume of continuous porous material from surface layer on both surfaces thereof
Region II: whole region of continuous porous material Another resin supply material is used for molding a fiber-reinforced resin, the resin supply material including a continuous porous material and a resin, wherein a variation M in mass content of the resin in the resin supply material as expressed by formula (II) is 0 to 0.1, and/or a variation D in specific gravity of the resin supply material as expressed by formula (III) is 0 to 0.1.

$$M = Mr/Ma \quad (II)$$

Ma: average of mass contents of resin which are determined from resin supply materials each cut out in a size of 0.1 cm³

Mr: standard deviation of mass contents of resin which are determined from resin supply materials each cut out in a size of 0.1 cm³

$$D = Dr/Da \quad \text{(III)}$$

Da: average of specific gravities of resin supply materials each cut out in a size of 0.1 cm³

Dr: standard deviation of specific gravities of pieces resin supply materials each cut out in a size of 0.1 cm³

A further resin supply material is used for molding a fiber-reinforced resin, the resin supply material including a continuous porous material and a resin, wherein a thickness change ratio T in the resin supply material as expressed by formula (IV) is within the range of more than 1 and 6 or less.

$$T = Trt/Tri \quad \text{(IV)}$$

Tri: average of thicknesses of resin supply material just after supply of resin for obtaining fiber-reinforced resin Trt: average of thicknesses of resin supply material remaining in the resulting fiber-reinforced resin A preform is formed by laminating and integrating the resin supply material and a base material.

A method of producing a fiber-reinforced resin is a method of producing a fiber-reinforced resin molded by heating and pressurizing the preform, the method including supplying a thermosetting resin or a resin from a resin supply material to a base material.

There can be provided a resin supply material that is excellent in resin storage characteristic and handling characteristic, and a method of producing a fiber-reinforced resin using the resin supply material.

There can be provided a resin supply material capable of improving a handling characteristic in production of a fiber-reinforced resin, and securing both productivity and a production yield for the resulting fiber-reinforced resin, and a method of producing a fiber-reinforced resin using the resin supply material.

DESCRIPTION OF REFERENCE SIGNS

1: Resin supply material
2: Base material
3: Preform
4: Continuous porous material
11: Fiber-reinforced resin

DETAILED DESCRIPTION

First Construction

Figure 1:
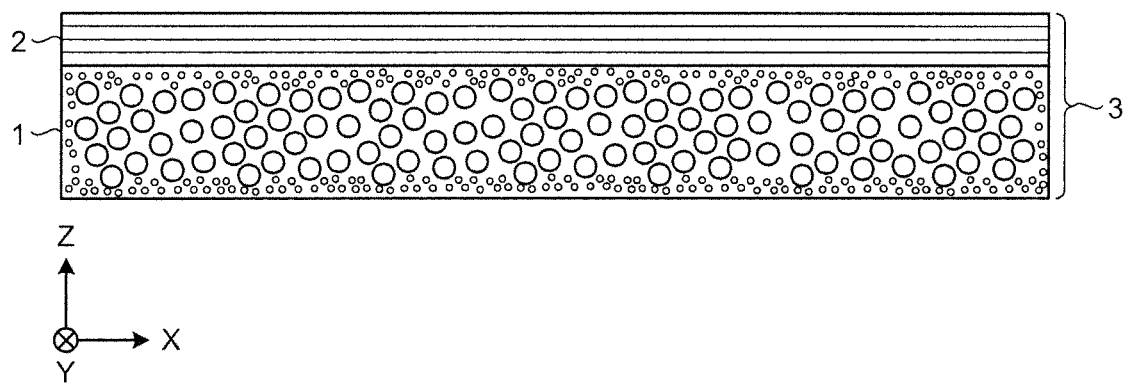
FIG. 1 is a schematic view showing a configuration of a preform including a resin supply material, and a base material.

We provide a resin supply material including a continuous porous material and a thermosetting resin. As shown in FIG. 1, a resin supply material 1 allows a fiber-reinforced resin to be molded by laminating the resin supply material 1 with a base material 2 to prepare a preform 3, heating and pressurizing the preform 3 in, for example, a closed space to supply a thermosetting resin from the resin supply material 1 to the base material 2.

The preform means a laminate obtained by laminating and integrating the resin supply material 1 and the base material 2, and examples thereof may include a sandwich laminate in which an outermost layer of a laminate obtained by laminating and integrating a predetermined number of resin supply materials 1 is sandwiched between base materials 2; an alternating laminate in which resin supply materials 1 and base materials 2 are alternately laminated; and a combination thereof. Formation of a preform beforehand is preferred because the base material 2 can be quickly and more uniformly impregnated with the thermosetting resin in a process of producing a fiber-reinforced resin.

In a method of producing a fiber-reinforced resin using the resin supply material 1, it is necessary to supply a thermosetting resin from the resin supply material 1 to the base material 2 while preventing generation of voids as much as possible and, therefore, it is desirable to carry out press molding or vacuum-pressure molding. A mold for molding may be a double-sided mold such as a closed mold composed of a rigid body, or a single-sided mold. In the latter case, the preform 3 can also be disposed between a flexible film and a rigid open mold (where the preform 3 is pressurized because a space between the flexible film and the rigid open mold is depressurized as compared to the outside).

The resin supply material 1 includes a continuous porous material and a thermosetting resin, and is preferably in the form of a sheet. The thickness of the sheet is preferably 0.5 mm or more, more preferably 1 mm or more, still more preferably 1.5 mm or more from the viewpoint of a resin supply characteristic and dynamic characteristics. From the viewpoint of a handling characteristic and moldability, the thickness of the sheet is preferably 100 mm or less, more preferably 60 mm or less, still more preferably 30 mm or less.

An average pore cross-sectional area ratio P of the resin supply material 1 as expressed by formula (I) is preferably 1.1 or more, more preferably 1.3 or more, still more preferably 1.5 or more. When the average pore cross-sectional area ratio P is less than 1.1, the resin may be leaked in conveyance of the resin supply material 1, or the resin storage amount may decrease. A method of deriving an average pore cross-sectional area ratio will be described later.

$$P = AII/AI \quad \text{(I)}$$

Figure 2:
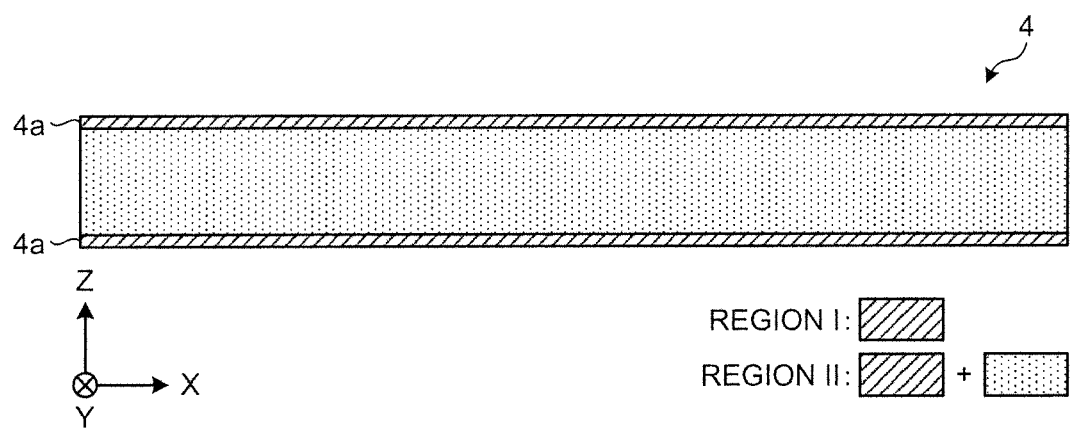
FIG. 2 is a view showing a region I and a region II in a continuous porous material.

AI: average pore cross-sectional area in region I
AII: average pore cross-sectional area in region II
Region I: region occupying 10% of the total volume of a continuous porous material 4 from a surface layer 4a on both surfaces thereof as shown in FIG. 2 (i.e., region occupying 10% of the thickness of the continuous porous material 4 from the surface layer 4a)

Region II: the whole region of the continuous porous material 4 as shown in FIG. 2 (i.e., the thickness of the region II is 10 where the thickness of the region I for the surface layer 4a on each of both the surfaces is 1)

The continuous porous material 4 will now be described. The continuous porous material 4 to be used in the resin supply material 1 mainly includes a space with a ventilation path communicating with the outside (i.e., a continuous space), but the continuous porous material 4 may include a closed space having no ventilation path to the degree that the purpose is not impaired. Specifically, the ratio of the closed space to the total space is preferably 30% or less, more preferably 20% or less, still more preferably 10% or less from the viewpoint of a resin storage characteristic. The ratio of the closed space to the total space is determined in accordance with JIS K7138 (2006).

Preferably, the continuous porous material 4 in the resin supply material 1 has two or more logarithmic differential pore volume peaks of 0.5 $cm^3/g$ or more in a logarithmic differential pore volume-pore diameter distribution determined in accordance with JIS R1655 (2003) to ensure that in a non-pressurized state, a resin is not leaked from a surface layer portion of the continuous porous material 4 and thus a large amount of the resin can be stored therein.

The pore diameter at a logarithmic differential pore volume peak of 0.5 $cm^3/g$ or more in the region I of the continuous porous material 4 in the resin supply material 1 is preferably 500 μm or less, more preferably 300 μm or less, still more preferably 100 μm or less for ensuring that a resin is not leaked from the surface layer portion of the continuous porous material 4 in a non-pressurized state, and flows out in heating and pressurization. The pore diameter at which the pore volume ratio is 90% or more in the region I of the continuous porous material 4 is preferably 500 μm or less, more preferably 300 μm or less, still more preferably 100 μm or less. The pore volume ratio is determined from a cumulative pore volume-pore diameter distribution in accordance with JIS R1655 (2003).

The porosity of the continuous porous material 4 is preferably 85% or more, more preferably 90% or more, still more preferably 95% or more from the viewpoint of a resin supply characteristic. A method of measuring porosity will be described later.

The continuous porous material 4 may be a resin foam, a reinforcing fiber base material, or a combination of different materials. The resin foam may be a thermosetting resin foam or a thermoplastic resin foam as long as it is a soft foam. The reinforcing fiber base material may be one composed of continuous fibers to be used in a unidirectional base material, a fabric base material or the like, but the reinforcing fiber base material is preferably one composed of discontinuous fibers from the viewpoint of a resin supply characteristic. The reinforcing fiber is preferably in the form of a web in which fibers are dispersed in a bundle shape or a monofilament shape, and gaps to be impregnated with a resin exist between the fibers. The form and the shape of the web are not limited and, for example, carbon fibers may be mixed with organic fibers, an organic compound or an inorganic compound, carbon fibers may be sealed together by other component, or carbon fibers may be bonded to a resin component. As a preferred form for easily producing a web in which fibers are dispersed, mention may be made of, for example, a base material which is in the form of a non-woven fabric obtained by a dry method or a wet method and in which carbon fibers are sufficiently opened, and monofilaments are bonded together by a binder composed of an organic compound.

In the reinforcing fiber base material to be used in the resin supply material 1 which includes the continuous porous material 4 and a thermosetting resin and which is used for molding a fiber-reinforced resin, a web composed of reinforcing fibers may have a specific fiber length, form a strong network, and have high strength, and a spring back characteristic as described later. When a web having high strength and a spring back characteristic is used as the continuous porous material 4 in the resin supply material 1, a fiber-reinforced resin having an excellent resin supply characteristic and high strength is easily obtained (i.e. the fiber volume content is easily increased). The spring back force can be defined as a web compressive stress (spring back force) at a porosity of 90% in accordance with JIS K6400-2 (Hardness and Compressive Deflection—Method A-1, 2012). For the reinforcing fibers, the web compressive stress at a porosity of 90% is preferably 5 kPa or more, more preferably 50 kPa or more, still more preferably 100 kPa or more.

As a kind of reinforcing fibers, carbon fibers are preferred, but the reinforcing fibers may be glass fibers, aramid fibers, metal fibers or the like. The carbon fibers are not particularly limited and, for example, polyacrylonitrile (PAN)-based carbon fibers, pitch-based carbon fibers and rayon-based carbon fibers can be preferably used from the viewpoint of an effect of reducing the weight of the fiber-reinforced resin. One kind of the carbon fibers, or a combination of two or more kinds of the carbon fibers may be used. Among them, PAN-based carbon fibers are further preferred from the viewpoint of a balance between the strength and the elastic modulus of the resulting fiber-reinforced resin. The monofilament diameter of the reinforcing fibers is preferably 0.5 μm or more, more preferably 2 μm or more, still more preferably 4 μm or more. The monofilament diameter of the reinforcing fibers is preferably 20 μm or less, more preferably 15 μm or less, still more preferably 10 μm or less. The strand strength of the reinforcing fibers is preferably 3.0 GPa or more, more preferably 4.0 GPa or more, still more preferably 4.5 GPa or more. The strand elastic modulus of the reinforcing fibers is preferably 200 GPa or more, more preferably 220 GPa or more, still more preferably 240 GPa or more. When the strand strength or the elastic modulus of the reinforcing fibers are less than 3.0 GPa or less than 200 GPa, respectively, it may be unable to obtain desired characteristics as a fiber-reinforced resin. [0032]

A fiber weight content Wfi of the resin supply material 1 is preferably 0.5% or more, more preferably 1.0% or more, still more preferably 1.5% or more. When the fiber weight content Wfi is less than 0.5%, the amount of the thermosetting resin is excessively large with respect to reinforcing fibers, the resin cannot be supported on the reinforcing fibers, or a large amount of the resin flows to the outside during molding. The fiber weight content Wfi (before molding) of the resin supply material 1 as expressed by formula (II) is preferably 30% or less, more preferably 22% or less, still more preferably 15% or less. When the fiber weight content Wfi is more than 30%, the fiber-reinforced resin may have a large number of voids due to poor impregnation of the resin into the base material 2. The fiber weight content Wfi is determined in accordance with JIS K7075 (1991).

The fiber weight content Wfi of the resin supply material 1 can be determined in accordance with JIS K7075 (1991) using only the resin supply material 1 taken out by polishing or cutting a preform including the resin supply material 1.

When it is difficult to perform measurement in an uncured state, a resin supply material cured in a non-pressurized state.

$$Wfi = Wf1/(Wf1+Wr1) \times 100(\%) \quad \text{(II)}$$

Wf1: fiber weight (g) in resin supply material before molding

Wr1: resin weight (g) in resin supply material before molding

A fiber volume content Vfi (before molding) of the resin supply material 1 as expressed by formula (III) is preferably 0.3% or more, more preferably 0.6% or more, still more preferably 1.0% or more. When the fiber volume content Vfi is less than 0.3%, the amount of the thermosetting resin is excessively large with respect to reinforcing fibers, the resin cannot be supported on the reinforcing fibers, or a large amount of the resin flows to the outside during molding. The fiber volume content Vfi (before molding) of the resin supply material 1 as expressed by formula (III) is preferably 20% or less, more preferably 15% or less, still more preferably 10% or less. When the fiber volume content Vfi is more than 20%, the fiber-reinforced resin may have a large number of voids due to poor impregnation of the resin into the base material 2. The fiber volume content Vfi is determined in accordance with JIS K7075 (1991). In place of the above-mentioned method of determining the fiber volume content Vfi, the fiber volume content Vfi may be determined from the following formula using a thickness T1 (unit: mm, measured value), a weight per unit area Faw of reinforcing fibers (unit: g/m², catalog value or measured value), and a density ρ of reinforcing fibers (unit: g/cm³, catalog value or measured value). The thickness T1 is determined from an average of thicknesses of the resin supply material 1 at randomly selected ten points within an area of 50 mm (length)×50 mm (width) using a microscope. The thickness direction is a direction orthogonal to a contact surface with the base material 2 to be used in the preform.

The fiber volume content Vfi of the resin supply material 1 can be determined in accordance with JIS K7075 (1991) using only the resin supply material 1 taken out by polishing or cutting a preform including the resin supply material 1. When it is difficult to perform measurement in an uncured state, a resin supply material cured in a non-pressurized state.

$$Vfi = Vf1/Vp1 \times 100(\%) \quad \text{(III)}$$

Vf1: fiber volume (mm³) in resin supply material before molding

Vp1: volume (mm³) of resin supply material before molding $$Vfi = Faw/\rho/T1/10(\%)$$

Faw: weight per unit area (g/m²) of reinforcing fibers

ρ: density (g/cm³) of reinforcing fibers

T1: thickness (mm) of resin supply material

The mean fiber length of the reinforcing fibers is preferably 0.1 mm or more, more preferably 1 mm or more, still more preferably 2 mm or more. The mean fiber length of the reinforcing fibers is preferably 100 mm or less, more preferably 50 mm or less, still more preferably 10 mm or less. Examples of the method of measuring the mean fiber length include a method in which reinforcing fibers are directly extracted from a reinforcing fiber base material; and a method in which a prepreg is dissolved using a solvent capable of dissolving only a resin of the prepreg, and the remaining reinforcing fibers are separated by filtration, and measured by microscopic observation (dissolution method). When a solvent capable of dissolving a resin is not available, mention is made of, for example, a method in which only the resin is burned off in a temperature range over which the oxidative weight loss of reinforcing fibers does not occur, and the reinforcing fibers are separated, and measured by microscopic observation (burning method). The measurement can be performed by randomly selecting 400 reinforcing fibers, measuring the lengths of the reinforcing fibers to the order of 1 μm using an optical microscope, and determining fiber lengths and ratios thereof. In a comparison between the method in which reinforcing fibers are directly extracted from a reinforcing fiber base material and the method in which reinforcing fibers are extracted from a prepreg by a burning method or a dissolution method, there is no significant difference between the results obtained by the former method and the latter method as long as conditions are appropriately selected.

"Having a spring back characteristic" as described above means meeting the following requirement: $t_1 < t_2 \leq t_0$ where $t_0$ is an initial thickness of the web; $t_1$ is a thickness of the web when the web is pressurized at 0.1 MPa; and $t_2$ is a thickness of the web when a load is applied to the web, and the load is then removed. The thickness change ratio R ($=t_0/t_1$) is preferably 1.1 or more, more preferably 1.3 or more, still more preferably 1.5 or more. When the thickness change ratio R is less than 1.1, it may be unable to obtain a molded product having a desired shape due to deterioration of the resin supply characteristic and shape formability. The thickness change ratio R is preferably 10 or less, more preferably 7 or less, still more preferably 4 or less. When the thickness change ratio $t_0/t_1$ is more than 10, the handling characteristic of the resin supply material 1 may be deteriorated in impregnation of a resin. The method of measuring an initial thickness and a thickness when a load is removed is not particularly limited and, for example, the thickness can be measured using a micrometer, a caliper, a three-dimensional measurement device or a laser displacement meter, or by microscopic observation. In microscopic observation, the web may be observed directly, or observed after the web is embedded in a thermosetting resin, and a cross-section is polished. The method of measuring the thickness when a load is applied is not particularly limited, and for example, the thickness can be measured by applying a load to the web composed of reinforcing fibers using a bending tester or a compression tester, and reading a displacement.

The orientation of fibers on an X-Y plane of the web (the X-Y plane is in a base material plane and an axis orthogonal to a certain axis (X axis) in the base material plane is a Y axis, and an axis extending in a thickness direction of the base material (i.e. a direction vertical to the base material plane) is a Z axis) is preferably isotropic. An average of fiber two-dimensional orientation angles on the X-Y plane as measured by a measurement method as described later is preferably 5 degrees or more, more preferably 20 degrees or more, still more preferably 30 degrees or more. The closer to the ideal angle: 45 degrees, the better. When the average of fiber two-dimensional orientation angles is less than 5 degrees, it may be necessary to consider a lamination direction of the resin supply material 1 because the dynamic characteristics of the fiber-reinforced resin significantly vary depending on the direction.

An average of fiber two-dimensional orientation angles on a plane orthogonal to the X-Y plane of the web as measured by a measurement method as described later is preferably 5 degrees or more, more preferably 10 degrees or more, still more preferably 20 degrees or more for improving the resin support characteristic. The average of fiber two-dimensional orientation angles on the plane orthogonal to the X-Y plane of the web is preferably 85 degrees or less, more preferably 80 degrees or less, still more preferably 75 degrees or less. When the average of fiber two-dimensional orientation angles is less than 5 degrees, or more than 85 degrees, fibers may be in close contact with one another, resulting in deterioration of the resin support characteristic.

A mass per unit area of a web composed of reinforcing fibers that are preferably used is preferably 1 g/m² or more, more preferably 10 g/m² or more, still more preferably 30 g/m² or more. When the mass per unit area is less than 1 g/m², the resin support characteristic may be deteriorated, thus making it unable to secure a resin amount required for molding. Further, in the process of producing the web or the resin supply material 1, the handling characteristic may be poor, leading to deterioration of workability.

Preferably, fibers in the web composed of reinforcing fibers that are preferably used are bonded together by a binder. Accordingly, the handling characteristic and productivity of the web, and workability are improved, and the network structure of the web can be retained. The binder is not particularly limited, and examples of the binder that is preferably used include thermoplastic resins such as polyvinyl alcohol, ethylene-propylene copolymers, ethylene-vinyl acetate copolymers, polyvinyl chloride, polyvinylidene chloride, polyvinyl acetate, polycarbonate resins, styrene-based resins, polyamide-based resins, polyester-based resins, polyphenylene sulfide resins, modified polyphenylene ether resins, polyacetal resins, polyetherimide resins, polypropylene resins, polyethylene resins, fluororesins, thermoplastic acrylic resins, thermoplastic polyester resins, thermoplastic polyamideimide resins, acrylonitrile-butadiene copolymers, styrene-butadiene copolymers and acrylonitrile-styrene-butadiene copolymers; and thermosetting resins such as urethane resins, melamine resins, urea resins, thermosetting acrylic resins, phenol resins, epoxy resins and thermosetting polyester. A resin having at least one functional group selected from an epoxy group, a hydroxy group, an acrylate group, a methacrylate group, an amide group, a carboxyl group, a carboxylic acid, an acid anhydride group, an amino group and an imine group is preferably used from the viewpoint of the dynamic characteristics of the resulting fiber-reinforced resin. These binders may be used alone, or in combination of two or more thereof. The attaching amount of the binder is preferably 0.01% or more, more preferably 0.1% or more, still more preferably 1% or more. The attaching amount of the binder is preferably 20% or less, more preferably 15% or less, still more preferably 10% or less. When the attaching amount of the binder is more than 20%, much time may be required in a drying process, or resin impregnability may be deteriorated. When the attaching amount of the binder is less than 0.01%, it may be difficult to maintain the form of a web composed of reinforcing fibers, leading to deterioration of the handling characteristic when the web is used. A method of measuring the attaching amount of the binder will be described later.

The thermosetting resin to be used in the resin supply material 1 will be described. The viscosity of the thermosetting resin for use during impregnation is preferably 1000 Pa·s or less, more preferably 100 Pa·s or less, still more preferably 10 Pa·s or less. When the viscosity is more than 1000 Pa·s, voids may be generated in the resulting fiber-reinforced resin because the later-described base material 2 is not sufficiently impregnated with the thermosetting resin.

The kind of thermosetting resin is not particularly limited, and examples of the thermosetting resin that is preferably used include epoxy resins, vinyl ester resins, phenol resins, thermosetting polyimide resins, polyurethane resins, urea resins, melamine resins and bismaleimide resins. In addition to a single epoxy resin, a copolymer of an epoxy resin and a thermosetting resin, a modified product, a resin obtained by blending two or more kinds of resins, and so on can be used.

In the resin supply material 1, the volume of the thermosetting resin per unit mass of the continuous porous material 4 is preferably 150 cm³/g or less, more preferably 120 cm³/g or less, still more preferably 100 cm³/g or less. In the resin supply material 1, the volume of the thermosetting resin per unit mass of the continuous porous material 4 is preferably 3 cm³/g or more, more preferably 10 cm³/g or more, still more preferably 20 cm³/g or more. When the volume of the thermosetting resin per unit mass of the continuous porous material 4 is more than 150 cm³/g, the resin may be leaked during conveyance of the resin supply material 1. When the volume of the thermosetting resin per unit mass of the continuous porous material 4 is less than 3 cm³/g, the amount of resin supplied may decrease, leading to existence of a non-impregnated portion in a molded article.

The base material 2 to be used in the preform is a fiber base material composed of reinforcing fibers, and is preferably at least one selected from a fabric base material, a unidirectional base material and a mat base material each composed of reinforcing fibers. Specifically, a single fabric foundation cloth composed of continuous fibers or a laminate of such fabric foundation cloths, a product obtained by stitching and integrating the fabric foundation cloths by a stitch thread, a fiber structure such as a three-dimensional fabric or a braided product, a non-woven fabric formed of discontinuous fibers, or the like is preferably used. The continuous fiber means a reinforcing fiber in which a reinforcing fiber bundle is drawn and aligned in a continuous state without cutting the reinforcing fiber into short fibers. The form and the arrangement of reinforcing fibers to be used in the base material 2 can be appropriately selected from continuous fiber forms such as a unidirectionally drawn and aligned long fiber, a fabric, a tow and a roving. The number of filaments in one fiber bundle to be used in the base material 2 is preferably 500 or more, more preferably 1500 or more, still more preferably 2500 or more. The number of filaments in one fiber bundle is preferably 150000 or less, more preferably 100000 or less, still more preferably 70000 or less.

To obtain a fiber-reinforced resin having high dynamic characteristics, it is preferred that a fabric base material or unidirectional base material composed of continuous reinforcing fibers is used as the base material 2, and to increase the thermosetting resin impregnation rate to improve productivity of the fiber-reinforced resin, it is preferred that a mat base material composed of discontinuous fibers is used as the base material 2.

Examples of the method of producing a fiber-reinforced resin using the resin supply material 1 include the following method. First, the preform 3 including the resin supply material 1, and at least one base material 2 selected from a sheet-shaped base material, a cloth-shaped base material and a porous base material is prepared, and set on a metal mold. The resin supply material 1 is softened on the metal mold at a high temperature, and the thermosetting resin is then supplied to the base material 2 by pressurization. The pressurization method is preferably press molding or vacuum-pressure molding. The temperature during supply of the resin and the temperature during curing may be the same, or different. A mold for molding may be a double-sided mold such as a closed mold composed of a rigid body, or a single-sided mold. In the case of the latter, the preform 3 can also be disposed between a flexible film and a rigid open mold (where the preform 3 is pressurized because a space between the flexible film and the rigid open mold is depressurized as compared to the outside as described above). For the thermosetting resin, heating to a temperature at which the thermosetting resin is cured is performed after molding as necessary in addition to heating during molding so that the thermosetting resin is cured to obtain a fiber-reinforced resin.

Method of Deriving Average of Fiber Two-Dimensional Orientation Angles on X-Y Plane The average of fiber two-dimensional orientation angles on the X-Y plane is measured in the following steps I and II. As described above, the X axis, the Y axis and the Z axis are mutually orthogonal, the X-Y plane is in the base material plane, and the Z axis extends in the thickness direction of the base material.

I. An average of two-dimensional orientation angles with all reinforcing fiber monofilaments orthogonally crossing randomly selected reinforcing fiber monofilaments on the X-Y plane is measured. If there are many reinforcing fiber monofilaments crossing the reinforcing fiber monofilaments, an average measured for randomly selected 20 crossing reinforcing fiber monofilaments may be used alternatively.

II. The measurement in the step I is repeated five times in total for other reinforcing fiber monofilaments, and an average of the measured values is calculated as an average of fiber two-dimensional orientation angles.

The method of measuring an average of fiber two-dimensional orientation angles from a prepreg is not particularly limited, and mention may be made of, for example, a method in which the orientation of reinforcing fibers is observed from a surface of a prepreg. It is preferred to polish the prepreg surface to expose the fibers for more easily observing the reinforcing fibers. Mention may also be made of, for example, a method in which the orientation of reinforcing fibers is observed using light passing through a prepreg. It is preferred to thinly slice the prepreg for more easily observing the reinforcing fibers. Mention may also be made of, for example, a method in which a prepreg is observed by X-ray computerized tomography transmission, and an image of oriented reinforcing fibers is taken. In the case of reinforcing fibers having high X-ray transparency, it is preferred to mix tracer fibers with the reinforcing fibers or apply a tracer chemical to the reinforcing fibers for more easily observing the reinforcing fibers.

When it is difficult to perform measurement by the above-mentioned methods, mention may be made of, for example, a method in which the orientation of reinforcing fibers is observed after a resin is removed without collapsing the structure of the reinforcing fibers. For example, measurement can be performed in the following manner: a prepreg is sandwiched between two stainless meshes, and fixed by a screw or the like so that the prepreg does not move, a resin component is then burned off, and the resulting reinforcing fiber base material is observed with an optical microscope or an electron microscope.

Method of Deriving Average Pore Cross-Sectional Area and Average Pore Cross-Sectional Area Ratio A cross-section of the resin supply material 1 is observed with a microscope, the total area of gap portions and resin portions (portions other than a constituent material for the continuous porous material 4) and the number of closed cross-sections of the continuous porous material 4 in a region of 10 mm² are determined, and the total area of gap portions and resin portions is divided by the number of closed cross-sections of the continuous porous material 4 to derive an area per one pore. When it is difficult to perform measurement in an uncured state, a resin supply material cured in a non-pressurized state, or cured with an embedding resin not to collapse the structure of the continuous porous material 4 may be used. The region I occupying 10% of the total volume of the continuous porous material 4 from a surface layer on both surfaces thereof is divided in the thickness direction into five equal parts, areas per one pore of the cross-sections of the parts are measured, and an average of the areas is defined as an average pore cross-sectional area AI in the region I. The region II occupying the total volume of the continuous porous material 4 divided in the thickness direction into five equal parts, areas per one pore of the cross-sections of the parts are measured, and an average of the areas is defined as an average pore cross-sectional area AII in the region II. The average pore cross-sectional area ratio P is determined from the average pore cross-sectional areas AI and AII.

Method of Deriving Porosity

An apparent density $\rho_a$ (g/cm³) of the continuous porous material 4 is determined in the following manner. The continuous porous material 4 is cut into, for example, a cubic shape or a rectangular solid shape, the size of each side is measured using a ruler, a caliper or the like, and the volume of the continuous porous material 4 is determined, and set to V (cm³). The mass of the continuous porous material 4 cut into the above-mentioned shape is measured, and set to W (g). The mass W is divided by the volume V to determine the apparent density $\rho_a$.

A porosity $F_V$ (%) of the continuous porous material 4 is determined from formula (IV) using the volume V (cm³) and W (g) used in determination of the apparent density, and a specific gravity S (g/cm³) of a material that forms the continuous porous material 4.

$$F_V (\%) = (W/S)/V \times 100 \qquad (IV)$$

Method of Deriving Average of Fiber Two-Dimensional Orientation Angles on Plane Orthogonal to X-Y Plane The average of fiber two-dimensional orientation angles on a plane to the X-Y plane is measured in the following steps I and II.

I. Fiber two-dimensional orientation angles of randomly selected reinforcing fiber monofilaments on a plane orthogonal to the X-Y plane are measured. The fiber two-dimensional orientation angle is set to 0 degree when parallel to the Z axis, and to 90 degrees when vertical to the Z axis. Accordingly, the fiber two-dimensional orientation angle ranges from 0 degree to 90 degrees.

II. The measurement in the step I is performed for total 50 reinforcing fiber monofilaments, and an average of the measured values is calculated as an average of fiber two-dimensional orientation angles on a plane orthogonal to the X-Y plane.

The method of measuring an average of fiber inclination angles from a prepreg is not particularly limited, and mention may be made of, for example, a method in which the orientation of reinforcing fibers is observed from a Y-Z plane (Z-X plane) of a prepreg. It is preferred to polish a cross-section of the prepreg to expose the fibers for more easily observing the reinforcing fibers. Mention may also be made of, for example, a method in which the orientation of reinforcing fibers is observed using light passing through a prepreg. It is preferred to thinly slice the prepreg for more easily observing the reinforcing fibers. Mention may also be made of, for example, a method in which a prepreg is observed by X-ray computerized tomography transmission, and an image of oriented reinforcing fibers is taken. In reinforcing fibers having high X-ray transparency, it is preferred to mix tracer fibers with the reinforcing fibers or apply a tracer chemical to the reinforcing fibers for more easily observing the reinforcing fibers.

Method of Measuring Attaching Amount of Binder

Carbon fibers are weighed ($W_1$), and then left standing for 15 minutes in an electric furnace set at a temperature of 450° C. in a nitrogen flow at a rate of 50 liters/minute so that a binder is fully thermally decomposed. The carbon fibers are transferred to a container in a dry nitrogen flow at 20 liters/minute, cooled for 15 minutes, and then weighed ($W_2$), and a binder attaching amount is determined from formula (V).

$$\text{binder attaching amount (\%)}=(W_1-W_2)/W_1\times 100 \quad (V)$$

EXAMPLES

Reference Example 1

Reinforcing Fibers (Carbon Fibers)

From a copolymer mainly composed of PAN, continuous carbon fibers including total 12,000 monofilaments were prepared by performing spinning, a firing treatment and a surface oxidation treatment. The continuous carbon fibers had characteristics as shown below.

Monofilament diameter: 7 μm
Mass per unit length: 0.8 g/m
Specific gravity: 1.8
Tensile strength: 4600 MPa
Tensile elastic modulus: 220 GPa Reference Example 2

Thermosetting Resin (b) (Epoxy Resin)

An epoxy resin was prepared using 6 parts by mass of "jER (registered trademark)" 630 (manufactured by Mitsubishi Chemical Corporation), 19 parts by mass of "EPON (registered trademark)" 825 (manufactured by Mitsubishi Chemical Corporation), 15 parts by mass of diglycidyl aniline (manufactured by Nippon Kayaku Co., Ltd.), 60 parts by mass of "Kane Ace (registered trademark)" MX-416 (manufactured by Kaneka Corporation), 31 parts by mass of "jERCURE (registered trademark) W, and 1 part by mass of DIC-TBC (manufactured by DIC Corporation).

Reference Example 3

Carbon Fiber Web

The carbon fibers obtained in Reference Example 1 were cut to a predetermined length by a cartridge cutter to prepare chopped carbon fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material produced by a production apparatus for papermaking base materials using the dispersion liquid and the chopped carbon fibers. The production apparatus includes a cylindrical container as a dispersion tank which includes an opening cock in the lower part of the container and has a diameter of 1000 mm; and a linear transportation section (inclination angle: 30 degrees) connecting the dispersion tank and a papermaking tank. A stirrer is attached to an opening section on the upper surface of the dispersion tank, and the chopped carbon fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a carbon fiber base material (papermaking base material) connects to the mesh conveyor. In papermaking, the carbon fiber concentration in the dispersion liquid was adjusted to adjust the mass per unit area. About 5% by mass of a polyvinyl alcohol aqueous solution (KURARAY POVAL, manufactured by KURARAY CO., LTD.) as a binder was deposited on the carbon fiber base material subjected to papermaking, and dried in a drying furnace at 140° C. for 1 hour to prepare a desired carbon fiber web. The average pore cross-sectional area was 3800 μm$^2$, and the porosity was 98%.

The pore diameter and the pore volume ratio were measured in accordance with JIS R1655 (2003), and the result showed that the peak pore diameter was 60 μm, and the pore diameter at a pore volume ratio of 90% or more was 160 μm.

The mean fiber length was 5.8 mm, the average of fiber two-dimensional orientation angles on the X-Y plane was 47.3°, and the average of fiber two-dimensional orientation angles on a plane orthogonal to the X-Y plane was 80.7°.

Reference Example 4

Resin Film

A polypropylene resin (manufactured by Sumitomo Chemical Company, Limited; NOBLEN (registered trademark) AH-561) was press-molded to prepare 200 g/m$^2$ of a resin film.

Reference Example 5

Resin-Impregnated Web 200 g/m$^2$ of the resin film obtained in Reference Example 4 was disposed on a surface layer of 100 g/m$^2$ of the web obtained in Reference Example 3, the resin was melted on a press machine at 220° C., and then pressurized so that that the total thickness was 0.3 mm. The press surface was shifted so that the total thickness was 0.6 mm while the resin was in a molten state, and the resin was cooled to room temperature. The fiber volume content was 10%, the porosity was 50%, and the average pore cross-sectional area was 700 μm$^2$. The pore diameter and the pore volume ratio were measured in accordance with JIS R1655 (2003), and the result showed that the peak pore diameter was 30 μm, and the pore diameter at a pore volume ratio of 90% was 40 μm or less.

Reference Example 6

Resin Foam

A melamine foam (manufactured by BASF SE, type: BASOTECT UF Grade, porosity: 99%) had an average pore cross-sectional area of 31000 μm$^2$, a peak pore diameter of 100 μm, and a pore diameter of 220 μm or less at a pore volume ratio of 90%.

Reference Example 7

Resin Foam

A urethane foam (manufactured by Inoac Corporation, grade: ECT, porosity: 98%) had an average pore cross-sectional area of 126000 µm$^2$, and a peak pore diameter of 350 µm.

Reference Example 8

Resin Foam

A urethane foam (manufactured by Inoac Corporation, grade: MF-13, porosity 97%) had an average pore cross-sectional area of 502000 µm$^2$, and a peak pore diameter of 900 µm.

Evaluation criteria on resin leakage in the following examples and comparative examples are as follows. It was determined that resin leakage occurred when the epoxy resin fell at a rate of 0.5 ml per minute in lifting of the resin supply material and, otherwise, it was determined that resin leakage did not occur. Evaluation criteria on moldability are as follows. It was determined molding was impossible (×) when the ratio of a resin-non-impregnated portion existing in the surface layer of the molded article was 30% or more, and otherwise, it was determined that molding was possible (◯).

Example 1

Figure 3:
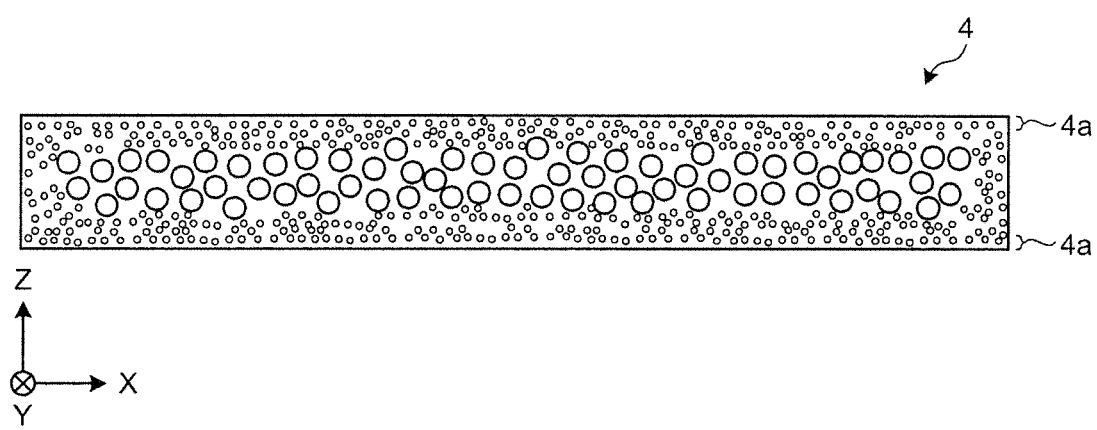
FIG. 3 is a view showing the region I and the region II in the continuous porous material, where a surface layer of the continuous porous material extends over the region I and the region II.

The resin foam (weight per unit area: 150 g/m$^2$, size: 13.8×13.8 cm$^2$) obtained in Reference Example 8 was impregnated with the epoxy resin (1500 g/m$^2$) obtained in Reference Example 2. Thereafter, the periphery of the resin foam was covered with the web (weight per unit area: 100 g/m$^2$) obtained in Reference Example 3 to prepare a resin supply material. The continuous porous material included the resin foam obtained in Reference Example 8 and the web obtained in Reference Example 3, and the thickness ratio of the web obtained in Reference Example 3 to the total thickness was 55% (i.e., a portion occupying 10% of the thickness of the continuous porous material from the surface layer 4a on both surfaces thereof belongs to the region I, and the other portion (occupying 35% of the thickness) belongs to the region II as shown in FIGS. 2 and 3). A logarithmic differential pore volume-pore diameter distribution was determined in accordance with JIS R1655 (2003) and, in this distribution, there were two logarithmic differential pore volume peaks of 0.5 cm$^3$/g or more which seemed to originate from the resin foam obtained in Reference Example 8 and the web obtained in Reference Example 3. Resin leakage did not occur in conveyance of the obtained resin supply material. The obtained resin supply material was embedded in resin, and the average pore cross-sectional area AI in the region I occupying 10% of the total volume of the continuous porous material from a surface layer thereof (web obtained in Reference Example 3) was measured. The result showed that the average pore cross-sectional area AI was 3800 µm$^2$. The average pore cross-sectional area AII in the region II occupying the total volume of the continuous porous material (web obtained in Reference Example 3 and resin foam obtained in Reference Example 8) was 352000 µm$^2$, and the ratio of AII/AI was 92.6. The volume of the thermosetting resin per unit mass of the continuous porous material was 5 cm$^3$/g, the porosity was 97%, and the ratio of the closed space to the total space in the continuous porous material as determined in accordance with JIS K7138 (2006) was less than 5%.

Example 2

A flat plate was prepared using the resin supply material prepared in Example 1 and a dry fabric (Cloth manufactured by Toray Industries, Inc., grade: CO6343B, plain fabric, weight per unit area of carbon fibers: 198 g/m$^2$). The molding process includes the following steps.
(1) Two dry fabric layers are disposed on each of front and back surfaces of a resin supply material (size: 13.8×13.8 cm$^2$).
(2) The laminate in the step (1) is preheated at zero pressure and 70° C. for about 10 minutes using a press machine.
(3) The laminate is pressurized at 1 MPa.
(4) The laminate is heated to 150° C. at a rate of 3° C./minute, and then held for 40 minutes to be cured.

The dry fabric was impregnated up to a surface thereof with a resin, and a molded article having a favorable external appearance was obtained.

Example 3

The resin web (weight per unit area of carbon fibers: 100 g/m$^2$, size: 13.8×13.8 cm$^2$) obtained in Reference Example 3 was impregnated with the epoxy resin (1500 g/m$^2$) obtained in Reference Example 2. Thereafter, the periphery of the resin foam was covered with the resin-impregnated web (weight per unit area: 100 g/m$^2$) obtained in Reference Example 5 to prepare a resin supply material. The continuous porous material included the web obtained in Reference Example 3 and the resin-impregnated web obtained in Reference Example 5, and the thickness ratio of the resin-impregnated web obtained in Reference Example 5 to the total thickness was 29% (i.e. a portion occupying 10% of the thickness of the continuous porous material from the surface layer 4a on both surfaces thereof belongs to the region I, and the other portion (occupying 9% of the thickness) belongs to the region II as shown in FIGS. 2 and 3). A logarithmic differential pore volume-pore diameter distribution was determined in accordance with JIS R1655 (2003), and in this distribution, there were two logarithmic differential pore volume peaks of 0.5 cm$^3$/g or more which seemed to originate from the web obtained in Reference Example 3 and the resin-impregnated web obtained in Reference Example 5. Resin leakage did not occur in conveyance of the obtained resin supply material. The obtained resin supply material was embedded in resin, and the average pore cross-sectional area AI in the region I occupying 10% of the total volume of the continuous porous material from a surface layer thereof (web obtained in Reference Example 5) was measured. The result showed that the average pore cross-sectional area AI was 700 µm$^2$. The average pore cross-sectional area AII in the region II occupying the total volume of the continuous porous material (web obtained in Reference Example 3 and resin-impregnated web obtained in Reference Example 5) was 2500 µm$^2$, and the ratio of AII/AI was 3.6. The volume of the thermosetting resin per unit mass of the continuous porous material was 3.1 cm$^3$/g, the porosity was 90%, and the ratio of the closed space to the total space in the continuous porous material as determined in accordance with JIS K7138 (2006) was less than 5%.

Example 4

A flat plate was prepared using the resin supply material prepared in Example 2 and a dry fabric (Cloth manufactured by Toray Industries, Inc., grade: CO6343B, plain fabric, weight per unit area of carbon fibers: 198 g/m²). The molding process includes the following steps.
(1) Two dry fabric layers are disposed on each of front and back surfaces of a resin supply material (size: 13.8×13.8 cm²).
(2) The laminate in the step (1) is preheated at zero pressure and 70° C. for about 10 minutes using a press machine.
(3) The laminate is pressurized at 1 MPa.
(4) The laminate is heated to 150° C. at a rate of 3° C./minute, and then held for 40 minutes to be cured.

The dry fabric was impregnated up to a surface thereof with a resin, and a molded article having a favorable external appearance was obtained.

Example 5

The resin foam (weight per unit area: 90 g/m², size: 13.8×13.8 cm²) obtained in Reference Example 7 was impregnated with the epoxy resin (1500 g/m²) obtained in Reference Example 2. Thereafter, the periphery of the resin foam was covered with the resin foam (weight per unit area: 32 g/m²) obtained in Reference Example 6 to prepare a resin supply material. The continuous porous material included the resin foam obtained in Reference Example 7 and the resin foam obtained in Reference Example 6, and the thickness ratio of the resin foam obtained in Reference Example 6 to the total thickness was 51% (i.e. a portion occupying 10% of the thickness of the continuous porous material from the surface layer on both surfaces thereof belongs to the region I, and the other portion (occupying 31% of the thickness) belongs to the region II as shown in FIG. 3). A logarithmic differential pore volume-pore diameter distribution was determined in accordance with JIS R1655 (2003), and in this distribution, there were two logarithmic differential pore volume peaks of 0.5 cm³/g or more which seemed to originate from the resin foam obtained in Reference Example 7 and the resin foam obtained in Reference Example 6. Resin leakage did not occur in conveyance of the obtained resin supply material. The obtained resin supply material was embedded in resin, and the average pore cross-sectional area AI in the region I occupying 10% of the total volume of the continuous porous material from a surface layer thereof (resin foam obtained in Reference Example 6) was measured. The result showed that the average pore cross-sectional area AI was 31000 μm². The average pore cross-sectional area AII in the region II occupying the total volume of the continuous porous material (resin foam obtained in Reference Example 7 and resin foam obtained in Reference Example 6) was 107000 μm², and the ratio of AII/AI was 3.5. The volume of the thermosetting resin per unit mass of the continuous porous material was 10.2 cm³/g, the porosity was 98%, and the ratio of the closed space to the total space in the continuous porous material as determined in accordance with JIS K7138 (2006) was less than 5%.

Example 6

A flat plate was prepared using the resin supply material prepared in Example 5 and a dry fabric (Cloth manufactured by Toray Industries, Inc., grade: CO6343B, plain fabric, weight per unit area of carbon fibers: 198 g/m²). The molding process includes the following steps.
(1) Two dry fabric layers are disposed on each of front and back surfaces of a resin supply material (size: 13.8×13.8 cm²).
(2) The laminate in the step (1) is preheated at zero pressure and 70° C. for about 10 minutes using a press machine.
(3) The laminate is pressurized at 1 MPa.
(4) The laminate is heated to 150° C. at a rate of 3° C./minute, and then held for 40 minutes to be cured.

The dry fabric was impregnated up to a surface thereof with a resin, and a molded article having a favorable external appearance was obtained.

Example 7

The resin foam (weight per unit area: 150 g/m², size: 13.8×13.8 cm²) obtained in Reference Example 8 was impregnated with the epoxy resin (1500 g/m²) obtained in Reference Example 2. Thereafter, the periphery of the resin foam was covered with the resin foam (weight per unit area: 32 g/m²) obtained in Reference Example 6 to prepare a resin supply material. The continuous porous material included the resin foam obtained in Reference Example 8 and the resin foam obtained in Reference Example 6, and the thickness ratio of the resin foam obtained in Reference Example 6 to the total thickness was 48% (i.e., a portion occupying 10% of the thickness of the continuous porous material from the surface layer 4a on both surfaces thereof belongs to the region I, and the other portion (occupying 28% of the thickness) belongs to the region II as shown in FIGS. 2 and 3). A logarithmic differential pore volume-pore diameter distribution was determined in accordance with JIS R1655 (2003) and, in this distribution, there were two logarithmic differential pore volume peaks of 0.5 cm³/g or more which seemed to originate from the resin foam obtained in Reference Example 8 and the resin foam obtained in Reference Example 6. Resin leakage did not occur in conveyance of the obtained resin supply material. The obtained resin supply material was embedded in resin, and the average pore cross-sectional area AI in the region I occupying 10% of the total volume of the continuous porous material from a surface layer thereof (resin foam obtained in Reference Example 6) was measured. The result showed that the average pore cross-sectional area AI was 31000 μm². The average pore cross-sectional area AII in the region II occupying the total volume of the continuous porous material (resin foam obtained in Reference Example 8 and resin foam obtained in Reference Example 6) was 408000 μm², and the ratio of AII/AI was 13.1. The volume of the thermosetting resin per unit mass of the continuous porous material was 6.9 cm³/g, the porosity was 98%, and the ratio of the closed space to the total space in the continuous porous material as determined in accordance with JIS K7138 (2006) was less than 5%.

Example 8

A flat plate was prepared using the resin supply material prepared in Example 7 and a dry fabric (Cloth manufactured by Toray Industries, Inc., grade: CO6343B, plain fabric, weight per unit area of carbon fibers: 198 g/m²). The molding process includes the following steps.
(1) Two dry fabric layers are disposed on each of front and back surfaces of a resin supply material (size: 13.8×13.8 cm²).
(2) The laminate in the step (1) is preheated at zero pressure and 70° C. for about 10 minutes using a press machine.
(3) The laminate is pressurized at 1 MPa.
(4) The laminate is heated to 150° C. at a rate of 3° C./minute, and then held for 40 minutes to be cured.

The dry fabric was impregnated up to a surface thereof with a resin, and a molded article having a favorable external appearance was obtained.

Comparative Example 1

The resin foam (weight per unit area: 90 g/m², size: 13.8×13.8 cm²) in Reference Example 7 was impregnated with the epoxy resin (1500 g/m²) obtained in Reference Example 2 to prepare a resin supply material. Resin leakage occurred in conveyance of the obtained resin supply material. The obtained resin supply material had an average pore cross-sectional area of 121000 μm² in the region I and an average pore cross-sectional area of 118000 μm² in the region II, and thus the ratio of AII/AI was 0.98.

Comparative Example 2

The resin foam (weight per unit area: 150 g/m², size: 13.8×13.8 cm²) in Reference Example 8 was impregnated with the epoxy resin (1500 g/m²) obtained in Reference Example 2 to prepare a resin supply material. Resin leakage occurred in conveyance of the obtained resin supply material. The obtained resin supply material had an average pore cross-sectional area of 490000 μm² in the region I and an average pore cross-sectional area of 486000 μm² in the region II, and thus the ratio of AII/AI was 0.99.

Comparative Example 3

The web (weight per unit area of carbon fibers: 100 g/m², size: 13.8×13.8 cm²) in Reference Example 3 was impregnated with the epoxy resin (300 g/m²) obtained in Reference Example 2 to prepare a resin supply material. In the obtained resin supply material, the volume of the thermosetting resin per unit mass of the web in Reference Example 3 was 2.5 cm³/g.

Comparative Example 4

A flat plate was prepared using the resin supply material prepared in Comparative Example 3 and a dry fabric (Cloth manufactured by Toray Industries, Inc., grade: CO6343B, plain fabric, weight per unit area of carbon fibers: 198 g/m²). The molding process includes the following steps.
(1) Two dry fabric layers are disposed on each of front and back surfaces of a resin supply material (size: 13.8×13.8 cm²).
(2) The laminate in the step (1) is preheated at zero pressure and 70° C. for about 10 minutes using a press machine.
(3) The laminate is pressurized at 1 MPa.
(4) The laminate is heated to 150° C. at a rate of 3° C./minute, and then held for 40 minutes to be cured.

50% or more of the surface layer of the molded article was constituted by a resin-non-impregnated portion, and molding was impossible.

TABLE 1

| | Resin supply material Continuous porous material | | | | | | | |
|---|---|---|---|---|---|---|---|---|
| | Surface layer (on both surfaces) of continuous porous material | | | | | | Inner part of continuous porous material | |
| | Surface layer | Weight per unit area of base material (g/m²) | Specific gravity | Porosity (%) | Peak pore diameter (μm) | Pore diameter at 90% or less (μm) | Thickness [total on both surfaces] (mm) | Inner part | Weight per unit area of base material (g/m²) |
| Example 1 | Reference Example 3 | 100 | 1.8 | 98 | 60 | 160 | 5.6 | Reference Example 8 | 150 |
| Example 3 | Reference Example 5 | 300 | 1.1 | 50 | 30 | 40 | 1.1 | Reference Example 3 | 100 |
| Example 5 | Reference Example 6 | 32 | 1.5 | 99 | 100 | 220 | 4.3 | Reference Example 7 | 90 |
| Example 7 | Reference Example 6 | 32 | 1.5 | 99 | 100 | 220 | 4.3 | Reference Example 8 | 150 |
| Comparative Example 1 | | | | | Reference Example 7 | | | | 90 |
| Comparative Example 2 | | | | | Reference Example 8 | | | | 150 |
| Comparative Example 4 | | | | | Reference Example 3 | | | | 100 |

| | Resin supply material Continuous porous material | | | | | | |
|---|---|---|---|---|---|---|---|
| | Inner part of continuous porous material | | | | | Thickness ratio of surface layer portion (%) | Porosity (%) |
| | Specific gravity | Porosity (%) | Peak pore diameter (μm) | Thickness (mm) | Number of Peak pore diameter | | |
| Example 1 | 1.1 | 97 | 900 | 4.5 | 2 | 55 | 97 |
| Example 3 | 1.8 | 98 | 60 | 2.8 | 2 | 29 | 90 |
| Example 5 | 1.1 | 98 | 350 | 4.1 | 2 | 51 | 98 |
| Example 7 | 1.1 | 97 | 900 | 4.5 | 2 | 48 | 98 |

TABLE 1-continued

|  | | | | | | |
|---|---|---|---|---|---|---|
| Comparative Example 1 | 1.1 | 98 | 350 | 4.1 | 1 | 98 |
| Comparative Example 2 | 1.1 | 97 | 900 | 4.5 | 1 | 97 |
| Comparative Example 4 | 1.8 | 98 | 60 | 2.8 | 1 | 98 |

| | Resin supply material Thermosetting resin | | Resin leakage | Mold-ability | P (= AII/AI) | Volume of thermosetting resin per unit weight of continuous porous material (cm³/g) |
|---|---|---|---|---|---|---|
| | Weight per unit area of resin (g/m²) | Resin volume content (%) | | | | |
| Example 1 | 1500 | 90.2 | Not leaked | ○ | 92.6 | 5.0 |
| Example 3 | 1500 | 95.7 | Not leaked | ○ | 3.6 | 3.1 |
| Example 5 | 1500 | 93.9 | Not leaked | ○ | 3.5 | 10.2 |
| Example 7 | 1500 | 90.2 | Not leaked | ○ | 13.1 | 6.9 |
| Comparative Example 1 | 1500 | 93.9 | Leaked | x | 0.98 | 13.9 |
| Comparative Example 2 | 1500 | 90.2 | Leaked | x | 0.99 | 8.3 |
| Comparative Example 4 | 300 | 81.8 | Not leaked | x (non-impregnated portion present) | 1.03 | 2.5 |

Note)
Peak pore diameter: pore diameter at a logarithmic differential pore volume peak of 0.5 cm³/g or more.
Pore diameter at 90% or less: pore diameter at a pore volume ratio of 90% or more Second Construction The resin supply material is a resin supply material including a continuous porous material and a resin. Such a resin supply material allows a fiber-reinforced resin to be produced by laminating the resin supply material with a base material to prepare a preform, heating and pressurizing the preform in, for example, a metal mold to supply a resin from the resin supply material to the base material. The resin serves as a matrix resin for the fiber-reinforced resin.

In a method of producing a fiber-reinforced resin using the resin supply material, it is preferred that a resin can be supplied from the resin supply material to the base material while generation of voids is prevented as much as possible and, therefore, it is preferred to use a press molding method or a vacuum-pressure molding method. A metal mold to be used may be a double-sided mold such as a closed mold composed of a rigid body, or a single-sided mold. In the latter case, a preform can also be disposed between a flexible film and a rigid open mold (where the preform is pressurized because a space between the flexible film and the rigid open mold is depressurized as compared to the outside).

The resin supply material includes a continuous porous material and a resin, and is preferably in the form of a sheet. The thickness of the sheet is preferably 0.5 mm or more, more preferably 1 mm or more, still more preferably 1.5 mm or more, particularly preferably 2 mm or more from the viewpoint of a resin supply characteristic and dynamic characteristics. Generally, a decrease in thickness of the resin supply material tends to increase warpage of the resulting fiber-reinforced resin, but by using the resin supply material, a fiber-reinforced resin having reduced warpage can be obtained even when the resin supply material has a small thickness within the above-mentioned range. From the viewpoint of a handling characteristic and moldability, the thickness of the sheet is preferably 100 mm or less, more preferably 60 mm or less, still more preferably 30 mm or less. Generally, an increase in thickness of the resin supply material tends to increase sink marks on the resulting fiber-reinforced resin, but by using the resin supply material, a fiber-reinforced resin having reduced sink marks can be obtained even when the resin supply material has a large thickness within the above-mentioned range.

In the resin supply material, it is necessary that a variation D in mass content of the resin in the resin supply material as expressed by formula (I) be 0 to 0.1, or a variation M in specific gravity of the resin supply material as expressed by formula (II) be 0 to 0.1. It is preferred to meet both of the requirements are met. These requirements will be described below.

In the first construction of the resin supply material, the variation M in mass content of the resin in the resin supply material as expressed by formula (I) is required to be 0 to 0.1, and is preferably 0 to 0.05. When the variation M in mass content of the resin in the resin supply material is more than 0.1, a variation occurs in amount of resin supplied to the base material in a process of producing a fiber-reinforced resin, or a variation occurs in mass ratio of the continuous porous material and the resin in the resulting fiber-reinforced resin, resulting in occurrence of external appearance defects such as sink marks and warpage in the fiber-reinforced resin.

The variation M in mass content of the resin in the resin supply material is determined from formula (I).

$$M = Mr/Ma \quad (I)$$

Ma: average of mass contents of resin which are determined from resin supply materials each cut out in a size of 0.1 cm$^3$ Mr: standard deviation of mass contents of resin which are determined from resin supply materials each cut out in a size of 0.1 cm$^3$ When the resin used in the resin supply material is solid at room temperature, the resin supply material may be cut with care taken not to crush the resin, and when the resin is liquid at room temperature, the resin supply material may be cut under a freezing condition. As the freezing condition, mention may be made of, for example, an atmosphere at a temperature lower by 10° C. or more than a melting point of the resin as determined by differential scanning calorimetry (DSC). If the melting point cannot be detected, mention may be made of, for example, a method in which the variation is determined using a glass transition temperature as the melting point.

The mass content of the resin in the resin supply material can be determined from a mass difference before and after only the resin is removed from a sample with a size of 0.1 cm$^3$ which is cut out under the above-mentioned condition. Examples of the method of removing only the resin from the resin supply material include a method in which a resin is burned off with a resin supply material placed under a heating condition; and a method in which a resin supply material is immersed in a solvent that is not capable of dissolving a continuous porous material, and is capable of dissolving a resin.

The average here is a value determined by arithmetic averaging, and this value can be determined using 20 samples cut out at randomly selected positions on the resin supply material. The standard deviation can be determined from the results of measurement with samples identical to those used in the arithmetic averaging.

In the resin supply material in the second construction, the variation D in specific gravity of the resin supply material as expressed by formula (II) is required to be 0 to 0.1, and is preferably 0 to 0.05. When the variation D in specific gravity of the resin supply material is more than 0.1, a variation occurs in amount of resin supplied to the base material in a process of producing a fiber-reinforced resin, or a variation occurs in mass ratio of the continuous porous material and the resin in the resulting fiber-reinforced resin, resulting in occurrence of external appearance defects such as sink marks and warpage in the fiber-reinforced resin.

The variation D in specific gravity of the resin supply material is determined from formula (II).

$$D=Dr/Da \quad (II)$$

Da: average of specific gravities of resin supply materials each cut out in a size of 0.1 cm$^3$ Dr: standard deviation of specific gravities of pieces resin supply materials each cut out in a size of 0.1 cm$^3$ When the resin used in the resin supply material is solid at room temperature, the resin supply material may be cut with care taken not to crush the resin, and when the resin is liquid at room temperature, the resin supply material may be cut under a freezing condition. As the freezing condition, mention may be made of, for example, an atmosphere at a temperature lower by 10° C. or more than a melting point of the resin as determined by differential scanning calorimetry (DSC). If the melting point cannot be detected, mention may be made of, for example, a method in which the variation D is determined using a glass transition temperature as the melting point.

The specific gravity of the resin supply material can be determined in accordance with Method A (underwater substitution method) in JIS K7112 (1999) using a sample with a size of 0.1 cm$^3$ which is cut out under the above-mentioned condition. If the above-mentioned method of determining a specific gravity cannot be used, the variation can be determined using as the specific gravity a value calculated in the following manner: the mass (unit: g) of a sample cut out precisely in a size of 0.1 cm$^3$ is divided by a volume of 0.1 cm$^3$.

The average here is a value determined by arithmetic averaging, and this value can be determined using 20 samples cut out at randomly selected positions on the resin supply material. The standard deviation can be determined from the results of measurement with samples identical to those used in the arithmetic averaging.

The resin supply material exhibits a more excellent effect when meeting the requirements for both the first aspect and the second aspect.

The continuous porous material will now be described. The continuous porous material refers to a porous material in which included pores are mutually connected in a ratio at or above a certain level, and such a ratio may be in the range of, for example, 30 to 100% by volume in terms of a ratio of pores extending to the outer periphery of the porous material where the volume of the included pores is set to 100% by volume. The volume of such pores can be determined by a method in which the continuous porous material is photographed in observation by X-ray computerized tomography transmission. Specific examples of the continuous porous material include resin foams and cloths, but from the viewpoint of a balance between the handling characteristic of the resin supply material and the holding amount of the resin, it is preferred to use a cloth obtained from reinforcing fibers.

The reinforcing fiber will now be described. When a cloth obtained from reinforcing fibers is used as the continuous porous material, the reinforcing fiber to be used may be a continuous fiber that is used in a unidirectional base material, a fabric base material or the like, but the reinforcing fiber is preferably a discontinuous fiber from the viewpoint of a resin supply characteristic. The discontinuous fiber may be, for example, in a bundle shape or a monofilament shape, but the discontinuous fiber is preferably in the form of a web in which gaps more uniformly exist between the fibers. The form and the shape of the web are not limited and, for example, a plurality of reinforcing fibers may be mixed, reinforcing fibers may be sealed together by other component, or reinforcing fibers may be bonded to a resin component. As a preferred form for easily producing a web in which reinforcing fibers are dispersed, mention may be made of, for example, a base material which is in the form of a non-woven fabric obtained by a dry method or a wet method and in which reinforcing fibers are sufficiently opened, and monofilaments are bonded together by a binder composed of an organic compound.

From the viewpoint of production of the fiber-reinforced resin, the continuous porous material is preferably one in which a web composed of the reinforcing fibers has a specific fiber length, forms a strong network, and has high strength, and a spring back force as described later. Preferably, a web having high strength and a spring back force is used as a continuous porous material in the resin supply material because an excellent resin supply characteristic is attained, and a variation D' in specific gravity of a core layer containing the continuous porous material as described later is easily controlled. The spring back force can be defined as a web compressive stress (spring back force) at a porosity of 90% in accordance with JIS K6400-2 (Hardness and Compressive Deflection—Method A-1, 2012). The web compressive stress of the continuous porous material at a porosity of 90% is preferably 5 kPa or more, more preferably 50 kPa or more, still more preferably 100 kPa or more.

As a kind of reinforcing fibers, carbon fibers are preferred, but the reinforcing fibers may be glass fibers, aramid fibers, metal fibers or the like. The carbon fibers are not particularly limited and, for example, polyacrylonitrile (PAN)-based carbon fibers, pitch-based carbon fibers and rayon-based carbon fibers can be preferably used from the viewpoint of an effect of reducing the weight of the fiber-reinforced resin. One kind of the carbon fibers, or a combination of two or more kinds of the carbon fibers may be used. Among them, PAN-based carbon fibers are further preferred from the viewpoint of a balance between the strength and the elastic modulus of the resulting fiber-reinforced resin. The monofilament diameter of the reinforcing fibers is preferably 0.5 µm or more, more preferably 2 µm or more, still more preferably 4 µm or more. The monofilament diameter of the reinforcing fibers is preferably 20 µm or less, more preferably 15 µm or less, still more preferably 10 µm or less. The strand strength of the reinforcing fibers is preferably 3 GPa or more, more preferably 4 GPa or more, still more preferably 4.5 GPa or more. The strand elastic modulus of the reinforcing fibers is preferably 200 GPa or more, more preferably 220 GPa or more, still more preferably 240 GPa or more. When the strand strength or the elastic modulus of the reinforcing fibers are less than 3 GPa or less than 200 GPa, respectively, it may be unable to obtain desired characteristics as a fiber-reinforced resin.

The mean fiber length of the reinforcing fibers is preferably 0.1 mm or more, more preferably 1 mm or more, still more preferably 2 mm or more. The mean fiber length of the reinforcing fibers is preferably 100 mm or less, more preferably 50 mm or less, still more preferably 10 mm or less. Examples of the method of measuring the mean fiber length include a method in which reinforcing fibers are directly extracted from a continuous porous material, and measured by microscopic observation; and a method in which a resin in a resin supply material is dissolved using a solvent capable of dissolving only the resin, the remaining reinforcing fibers are separated by filtration, and measured by microscopic observation (dissolution method). When a solvent capable of dissolving a resin is not available, mention is made of, for example, a method in which only the resin is burned off in a temperature range over which the oxidative weight loss of reinforcing fibers does not occur, and the reinforcing fibers are separated, and measured by microscopic observation (burning method). The measurement can be performed by randomly selecting 400 reinforcing fibers, measuring the lengths of the reinforcing fibers to the order of 1 µm using an optical microscope, and determining fiber lengths and ratios thereof. In a comparison between the method in which reinforcing fibers are directly extracted from a continuous porous material and the method in which reinforcing fibers are extracted from a resin supply material by a burning method or a dissolution method, there is no significant difference between the results obtained by the former method and the latter method as long as conditions are appropriately selected.

Preferably, the orientation of fibers on an X-Y plane of the web (the X-Y plane is in a base material plane and an axis orthogonal to a certain axis (X axis) in the base material plane is a Y axis, and an axis extending in a thickness direction of the base material (i.e., a direction vertical to the base material plane) is a Z axis) has high isotropy. An average of fiber two-dimensional orientation angles on the X-Y plane as measured by a measurement method as described later is preferably 5 degrees or more, more preferably 20 degrees or more, still more preferably 30 degrees or more. The closer to the ideal angle: 45 degrees, the better. When the average of fiber two-dimensional orientation angles is less than 5 degrees, it may be necessary to consider a lamination configuration of the resin supply material because the fiber orientation is significantly biased in a specific direction so that dynamic characteristics significantly vary depending on the direction.

An average of fiber two-dimensional orientation angles on a plane orthogonal to the X-Y plane of the web as measured by a measurement method as described later is preferably 5 degrees or more, more preferably 10 degrees or more, still more preferably 20 degrees or more for improving the resin support characteristic. The average of fiber two-dimensional orientation angles on the plane orthogonal to the X-Y plane of the web is preferably 85 degrees or less, more preferably 80 degrees or less, still more preferably 75 degrees or less. When the average of fiber two-dimensional orientation angles on a plane orthogonal to the X-Y plane of the web is less than 5 degrees, or more than 85 degrees, the distances between fibers may decrease, resulting in deterioration of the resin support characteristic.

The mass per unit area of a web composed of reinforcing fibers that are used as a continuous porous material is preferably 1 g/m$^2$ or more, more preferably 10 g/m$^2$ or more, still more preferably 30 g/m$^2$ or more. When the mass per unit area is less than 1 g/m$^2$, the resin support characteristic may be deteriorated, thus making it unable to secure a resin amount required for production of the fiber-reinforced resin. Further, in the process of producing the web or the resin supply material, the handling characteristic may be poor, leading to deterioration of workability.

It is preferred that fibers in the web composed of reinforcing fibers that are used as a continuous porous material are bonded together by a binder. Accordingly, the handling characteristic and productivity of the web, and workability are improved, and the network structure of the web can be retained. The binder is not particularly limited, and examples of the binder that is preferably used include thermoplastic resins such as polyvinyl alcohol, ethylene-propylene copolymers, ethylene-vinyl acetate copolymers, polyvinyl chloride, polyvinylidene chloride, polyvinyl acetate, polycarbonate resins, styrene-based resins, polyamide-based resins, polyester-based resins, polyphenylene sulfide resins, modified polyphenylene ether resins, polyacetal resins, polyetherimide resins, polypropylene resins, polyethylene resins, fluororesins, thermoplastic acrylic resins, thermoplastic polyester resins, thermoplastic polyamideimide resins, acrylonitrile-butadiene copolymers, styrene-butadiene copolymers and acrylonitrile-styrene-butadiene copolymers; and thermosetting resins such as urethane resins, melamine resins, urea resins, thermosetting acrylic resins, phenol resins, epoxy resins and thermosetting polyester. A resin having at least one functional group selected from an epoxy group, a hydroxy group, an acrylate group, a methacrylate group, an amide group, a carboxyl group, an acid anhydride group, an amino group and an imino group is preferably used from the viewpoint of the dynamic characteristics of the resulting fiber-reinforced resin. These binders may be used alone, or in combination of two or more thereof. The attaching amount of the binder is preferably 0.01% by mass or more, more preferably 0.1% by mass or more, still more preferably 1% by mass or more based on the mass of reinforcing fibers loaded with the binder. The attaching amount of the binder is preferably 20% by mass or less, more preferably 15% by mass or less, still more preferably 10% by mass or less based on the mass of reinforcing fibers on which the binder is deposited. When the attaching amount of the binder is more than 20% by mass, resin impregnability may be deteriorated. When the attaching amount of the binder is less than 0.01% by mass, it may be difficult to maintain the form of a web composed of reinforcing fibers, leading to deterioration of the handling characteristic. A method of measuring the attaching amount of the binder will be described later.

The resin will now be described. The viscosity of the resin for use during impregnation of the resin into the continuous porous material is preferably 1000 Pa·s or less, more preferably 100 Pa·s or less, still more preferably 10 Pa·s or less. When the viscosity of the resin is more than 1000 Pa·s, a base material as described later cannot be sufficiently impregnated with the resin, and thus it may be unable to control the variation M in mass content of the resin in the resin supply material and the variation D in specific gravity of the resin supply material.

The kind of resin may be, for example, a thermosetting resin or a thermoplastic resin. As the thermosetting resin, at least one selected from an epoxy resin, a vinyl ester resin, a phenol resin, a thermosetting polyimide resin, a polyurethane resin, a urea resin, a melamine resin and a bismaleimide resin. Among these thermosetting resins, an epoxy resin is particularly preferred from the viewpoint of a balance between the temporal stability of the resin supply material and the dynamic characteristics of the resulting fiber-reinforced resin. The epoxy resin can be used not only singly, but also in the form of a copolymer with a thermosetting resin, a modified product and a blend of two or more resins, each of which is mainly composed of an epoxy resin. As the thermoplastic resin, at least one selected from polypropylene, polyethylene, polycarbonate, polyamide, polyester, polyarylene sulfide, polyphenylene sulfide, polyether ketone, polyether ether ketone, polyether ketone ketone, polyether sulfone, polyimide, polyamideimide, polyether imide and polysulfone, or a cyclic oligomer that is a precursor of any of these resins is preferably used.

The preform includes a resin supply material and a base material.

The base material to be used in the preform is a fiber base material composed of reinforcing fibers, and is preferably a fabric base material, a unidirectional base material or a mat base material composed of reinforcing fibers. For obtaining a fiber-reinforced resin having high dynamic characteristics, it is preferred that a fabric base material or unidirectional base material composed of continuous reinforcing fibers is used as the base material, and to increase the resin impregnation rate to improve productivity of the fiber-reinforced resin, it is preferred that a mat base material composed of discontinuous fibers is used as the base material.

The form and the arrangement of reinforcing fibers to be used in the base material can be appropriately selected from continuous fiber forms such as a unidirectionally drawn and aligned long fiber, a fabric, a tow and a roving. Usually, the base material does not contain a matrix resin, i.e., the base material is in a dry state.

As continuous reinforcing fibers and discontinuous fibers in the base material, the same kind of fibers as those shown as an example of reinforcing fibers to be used in the continuous porous material can be preferably used.

The base material is used to form a preform together with the resin supply material. The preform means a laminate obtained by laminating and integrating a resin supply material and a base material, and examples thereof may include a sandwich laminate in which an outermost layer of a laminate obtained by laminating and integrating a predetermined number of resin supply materials is sandwiched between base materials; an alternating laminate in which resin supply materials and base materials are alternately laminated; and a combination thereof. Formation of a preform beforehand is preferred because the base material can be quickly and more uniformly impregnated with a resin in a process of producing a fiber-reinforced resin.

Examples of the method of producing a fiber-reinforced resin using the resin supply material include a method in which a fiber-reinforced resin is molded by heating and pressurizing the preform in a metal mold. First, a preform including a resin supply material and a base material is prepared, and set on a metal mold. The preform is heated with the metal mold to soften the resin supply material, and then pressurized to supply to a resin to the base material and impregnate the base material with the resin. Examples of the pressurization method may include a press molding method and a vacuum-pressure molding method, and a press molding method is preferred from the viewpoint of productivity and external appearance of the resulting fiber-reinforced resin. In a method of producing a fiber-reinforced resin using a press molding method, the mold for molding is preferably a closed double-sided mold composed of a rigid body, and it is preferred to use a metallic mold that meets such a requirement. When the resin is a thermosetting resin, heating to a temperature at which the thermosetting resin is cured is performed after molding as necessary in addition to heating during molding so that the thermosetting resin is cured to obtain a fiber-reinforced resin. When the resin is a thermoplastic resin, the resin melted by heating during molding is cooled to solidify the resin so that a fiber-reinforced resin is obtained.

The surface temperature of the metal mold in the method of producing a fiber-reinforced resin is preferably 50° C. to 450° C. When the resin is a thermosetting resin, the temperature during supply of the resin and the temperature during curing may be the same, or different, but from the viewpoint of productivity of the fiber-reinforced resin, it is preferred that the temperature during supply of the resin and the temperature during curing are the same, i.e. supply of the resin to the base material and curing of the resin are performed simultaneously. When the resin is a thermosetting resin, the surface temperature of the metal mold is more preferably 50° C. to 200° C., still more preferably 80° C. to 180° C., especially preferably 100° C. to 160° C.

When the resin is a thermoplastic resin, the temperature during supply of the resin is preferably higher than the melting point of the resin by 10° C. or more. While such a temperature depends on the kind of resin, the surface temperature of the metal mold is preferably 150° C. to 450° C., more preferably 150° C. to 300° C. After the resin is supplied and before the fiber-reinforced resin is taken out, the surface temperature of the metal mold is preferably lower than the melting point of the resin by 10° C. or more, more preferably by 30° C. or more, still more preferably by 50° C. or more.

The pressure applied by the metal mold in the method of producing a fiber-reinforced resin is preferably 0.01 MPa to 20 MPa, more preferably 0.01 MPa to 10 MPa, still more preferably 0.01 MPa to 5 MPa. When the pressure is lower than 0.01 MPa, supply of the resin to the base material may be insufficient. When the pressure is higher than 10 MPa, the resin supplied once may be caused to excessively flow out from the base material, leading to an increase in incidence of external appearance defects of the fiber-reinforced resin such as warpage and sink marks.

Figure 4:
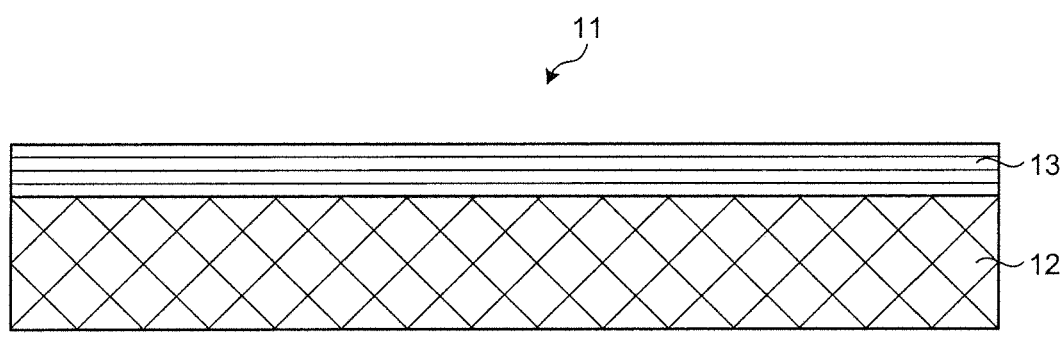
FIG. 4 is a schematic view showing a configuration of a fiber-reinforced resin.
Figure 5:
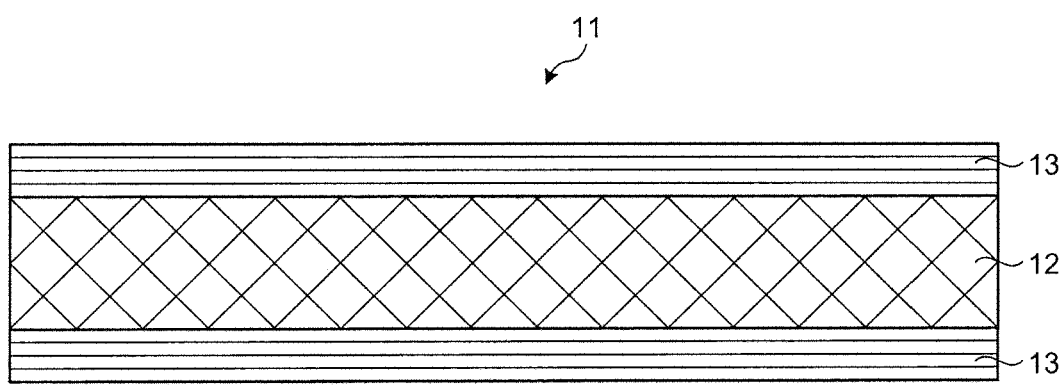
FIG. 5 is a schematic view showing a configuration of a fiber-reinforced resin.

The fiber-reinforced resin can be produced by forming a preform including a resin supply material and a base material, and heating and pressuring the preform to mold the preform. Since a part of the resin held by the resin supply material is supplied to the base material due to heating and pressurization, the resulting fiber-reinforced resin 11 includes a core layer 12 containing a continuous porous material, and a skin layer 13 containing a base material as shown in FIGS. 4 and 5. The core layer containing a continuous porous material refers to the continuous porous material after a part of the resin held by the resin supply material is supplied to the base material, and the skin layer containing a base material refers to the base material impregnated with the resin.

In the fiber-reinforced resin obtained in the manner described above, a variation D' in specific gravity of the core layer containing a continuous porous material is preferably 0 to 0.1, more preferably 0 to 0.05, the variation D' being expressed by formula (III). When the variation D' in specific gravity of the core layer containing a continuous porous material is more than 0.1, external appearance defects such as sink marks and warpage occur in the fiber-reinforced resin.

The variation D' in specific gravity of the core layer containing a continuous porous material is determined from formula (III).

$$D' = D'r/D'a \quad (III)$$

D'a: average of specific gravities of core layers containing a continuous porous material, which are each cut out in a size of 0.1 cm$^3$ D'r: standard deviation of specific gravities of core layers containing a continuous porous material, which are each cut out in a size of 0.1 cm$^3$ The sample with a size of 0.1 cm$^3$ may be cut out from the fiber-reinforced resin with care taken to not crush the fiber-reinforced resin.

The specific gravity of the core layer containing a continuous porous material can be determined in accordance with Method A (underwater substitution method) in JIS K7112 (1999) using a sample with a size of 0.1 cm$^3$ which is cut out under the above-mentioned condition.

The average here is a value determined by arithmetic averaging, and this value can be determined using 20 samples cut out at randomly selected positions on the core layer containing a continuous porous material. The standard deviation can be determined from the results of measurement with samples identical to those used in the arithmetic averaging.

The mass content of the resin held by the resin supply material is preferably 30% by mass to 99.5% by mass, more preferably in the range of 30% by mass to 95% by mass, still more preferably 60% by mass to 95% by mass based on 100% by mass of the resin supply material. It is preferred that the mass content of the resin held by the resin supply material is within the above-mentioned range because all of the handling characteristic of the resin supply material, a high holding amount of the resin and uniformity of the amount of the resin supplied to the base material are secured.

The content of the base material is preferably 0.1 parts by mass to 300 parts by mass, more preferably 20 parts by mass to 100 parts by mass, still more preferably 20 parts by mass to 80 parts by mass based on 100 parts by mass of the resin supply material in the preform. It is preferred that the content of the base material is within the above-mentioned range because uniformity of the amount of the resin supplied to the base material can be controlled so that the incidence of external appearance defects of the fiber-reinforced resin such as warpage and sink marks, can be reduced.

Method of Deriving Average of Fiber Two-Dimensional Orientation Angles on X-Y Plane The average of fiber two-dimensional orientation angles on the X-Y plane is measured in the following steps I-1 and I-2. As described above, the X axis, the Y axis and the Z axis are mutually orthogonal, the X-Y plane is in the base material plane, and the Z axis extends in the thickness direction of the base material.

I-1. An average of two-dimensional orientation angles with all reinforcing fiber monofilaments orthogonally crossing randomly selected reinforcing fiber monofilaments on the X-Y plane is measured. If there are many reinforcing fiber monofilaments crossing the reinforcing fiber monofilaments, an average measured for randomly selected 20 crossing reinforcing fiber monofilaments may be used alternatively.

I-2. The measurement in the step I-1 is repeated five times in total for other reinforcing fiber monofilaments, and an average of the measured values is calculated as an average of fiber two-dimensional orientation angles.

The method of measuring an average of fiber two-dimensional orientation angles from the resin supply material is not particularly limited, and mention may be made of, for example, a method in which the orientation of reinforcing fibers is observed from a surface of the resin supply material. It is preferred to polish the surface of the resin supply material to expose the fibers for more easily observing the reinforcing fibers. Mention may also be made of, for example, a method in which the orientation of reinforcing fibers is observed using light passing through the resin supply material. It is preferred to thinly slice the resin supply material to more easily observe the reinforcing fibers. Mention may also be made of, for example, a method in which the resin supply material is observed by X-ray computerized tomography transmission, and an image of oriented reinforcing fibers is taken. In reinforcing fibers having high X-ray transparency, it is preferred to mix tracer fibers with the reinforcing fibers or apply a tracer chemical to the reinforcing fibers for more easily observing the reinforcing fibers.

When it is difficult to perform measurement by the above-mentioned methods, mention may be made of, for example, a method in which the orientation of reinforcing fibers is observed after a resin is removed without collapsing the structure of the reinforcing fibers. For example, measurement can be performed in the following manner: the resin supply material is sandwiched between two stainless meshes, and fixed by a screw or the like so that the resin supply material does not move, a resin component is then burned off, and the resulting reinforcing fiber base material is observed with an optical microscope or an electron microscope.

Method of Deriving Average of Fiber Two-Dimensional Orientation Angles on Plane Orthogonal to X-Y Plane The average of fiber two-dimensional orientation angles on a plane to the X-Y plane is measured in the following steps II-1 and II-2.

II-1. Fiber two-dimensional orientation angles of randomly selected reinforcing fiber monofilaments on a plane orthogonal to the X-Y plane are measured. The fiber two-dimensional orientation angle is set to 0 degree when parallel to the Z axis, and to 90 degrees when vertical to the Z axis. Accordingly, the fiber two-dimensional orientation angle ranges from 0 degree to 90 degrees.

II-2. The measurement in the step II-1 is performed for total 50 reinforcing fiber monofilaments, and an average of the measured values is calculated as an average of fiber two-dimensional orientation angles on a plane orthogonal to the X-Y plane.

The method of measuring an average of fiber inclination angles from the resin supply material is not particularly limited, and mention may be made of, for example, a method in which the orientation of reinforcing fibers is observed from the Y-Z plane (Z-X plane) of the resin supply material. It is preferred to polish a cross-section of the resin supply material to expose the fibers to more easily observe the reinforcing fibers. Mention may also be made of, for example, a method in which the orientation of reinforcing fibers is observed using light passing through the resin supply material. It is preferred to thinly slice the resin supply material for more easily observing the reinforcing fibers. Mention may also be made of, for example, a method in which the resin supply material is observed by X-ray computerized tomography transmission, and an image of oriented reinforcing fibers is taken. In reinforcing fibers having high X-ray transparency, it is preferred to mix tracer fibers with the reinforcing fibers or apply a tracer chemical to the reinforcing fibers for more easily observing the reinforcing fibers.

Method of Measuring Attaching Amount of Binder

Reinforcing fibers loaded with a binder are weighed ($W_1$), and then left standing for 15 minutes in an electric furnace set at a temperature of 450° C. in a nitrogen flow at a rate of 50 liters/minute so that the binder is fully thermally decomposed. The reinforcing fibers are transferred to a container in a dry nitrogen flow at 20 liters/minute, cooled for 15 minutes, and then weighed ($W_2$), and a binder attaching amount is determined from the following formula.

$$\text{binder attaching amount (\% by mass)} = (W_1 - W_2)/W_1 \times 100$$

EXAMPLES

Hereinafter, our materials, preforms and methods will be described further in detail by way of examples. First, measurement methods will be described below.

(1) Evaluation on Variation in Mass Content of Resin Supply Material

The variation M in mass content of the resin in the resin supply material is determined from formula (I).

$$M = Mr/Ma \qquad (I)$$

Ma: average of mass contents of resin which are determined from resin supply materials each cut out in a size of 0.1 cm$^3$ Mr: standard deviation of mass contents of resin which are determined from resin supply materials each cut out in a size of 0.1 cm$^3$ The mass content of the resin in the resin supply material cut out in a size of 0.1 cm$^3$ can be determined in the following manner.

A sample is weighed (Ws), and then left standing under an air atmosphere for 30 minutes in an electric furnace set at a temperature of 500° C. so that a resin is thermally decomposed. The sample having the thermally decomposed resins is transferred to a container in a dry nitrogen flow at 20 liters/minute, cooled for 30 minutes, and then weighed (Wb), and a mass content (% by mass) of the resin is determined from the following formula.

$$\text{mass content (\% by mass) of resin} = (Ws - Wb)/Ws \times 100$$

The average here is a value determined by arithmetic averaging, and this value can be determined using 20 samples cut out at randomly selected positions on the resin supply material. The standard deviation can be determined from the results of measurement with samples identical to those used in the arithmetic averaging.

(2) Evaluation on Variation in Specific Gravity of Resin Supply Material

The variation D in specific gravity of the resin supply material is determined from formula (II).

$$D = Dr/Da \qquad (II)$$

Da: average of specific gravities of resin supply materials each cut out in a size of 0.1 cm$^3$ Dr: standard deviation of specific gravities of pieces resin supply materials each cut out in a size of 0.1 cm$^3$ The specific gravity of the resin supply material cut out in a size of 0.1 cm$^3$ can be determined in accordance with Method A (underwater substitution method) in JIS K7112 (1999). The average here is a value determined by arithmetic averaging, and this value can be determined using 20 samples cut out at randomly selected positions on the resin supply material. The standard deviation can be determined from the results of measurement with samples identical to those used in the arithmetic averaging.

(3) Evaluation on Variation in Specific Gravity of Continuous Porous Material

The variation D' in specific gravity of the core layer containing a continuous porous material is determined from formula (III).

$$D' = D'r/D'a \qquad (III)$$

D'a: average of specific gravities of core layers containing a continuous porous material, which are each cut out in a size of 0.1 cm$^3$ D'r: standard deviation of specific gravities of core layers containing a continuous porous material, which are each cut out in a size of 0.1 cm$^3$ The specific gravity of the core layer containing a continuous porous material, which is cut out in a size of 0.1 cm$^3$, can be determined in accordance with Method A (underwater substitution method) in JIS K7112 (1999). The average here is a value determined by arithmetic averaging, and this value can be determined using 20 samples cut out at randomly selected positions on the core layer containing a continuous porous material. The standard deviation can be determined from the results of measurement with samples identical to those used in the arithmetic averaging.

(4) Evaluation on Warpage of Fiber-Reinforced Resin

Figure 6:
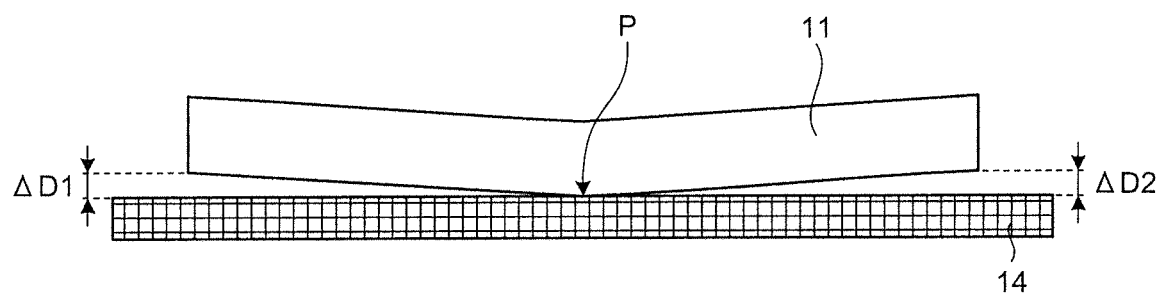
FIG. 6 is a view showing one example of warpage observed from a cross-section of the fiber-reinforced resin in the thickness direction.

Warpage refers to a phenomenon in which although a flat plate composed of a fiber-reinforced resin is produced such that two surfaces being in contact with a metal mold, the surface of the plate of the fiber-reinforced resin obtained after removal from the metal mold is curved rather than being a straight plane. A method of evaluating warpage will be described with reference to FIG. 6 that is a schematic view of a cross-section of the fiber-reinforced resin in the thickness direction. The fiber-reinforced resin 11 molded in the form of a flat plate with a length of 10 cm and a width of 10 cm using a metal mold is placed on a surface plate 14 having a straight plane as a surface. When a part of the fiber-reinforced resin 11 floats from the surface plate 14, the fiber-reinforced resin 11 is placed to be convex downward, whereby a contact point P between the fiber-reinforced resin 11 and the surface plate 14 is situated near the center of the fiber-reinforced resin 11. Shortest distances (ΔD1 and ΔD2) between the four corners of the fiber-reinforced resin 11 and the surface plate 14 are each measured, and an arithmetic average of the measured shortest distances is determined. Evaluation on warpage of the fiber-reinforced resin was performed in three grades based on the following criteria. A sample rated "good" was considered as passing the evaluation.

good: the average of distances between the corners of the fiber-reinforced resin and the surface plate is 2 mm or less (small warpage).

fair: the average of distances between the corners of the fiber-reinforced resin and the surface plate is more than 2 mm and 4 mm or less (large warpage).

bad: the average of distances between the corners of the fiber-reinforced resin and the surface plate is more than 4 mm (very large warpage).

(5) Evaluation on Sink Marks on Fiber-Reinforced Resin

Figure 7:
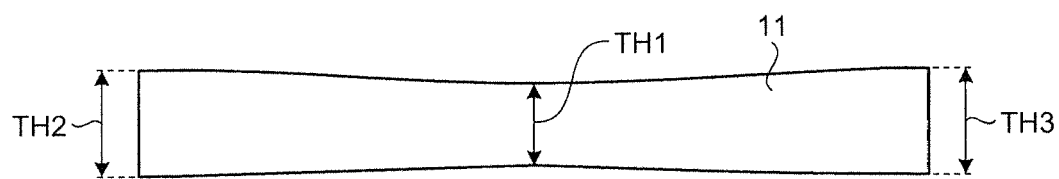
FIG. 7 is a view showing one example of sink marks observed from a cross-section of the fiber-reinforced resin in the thickness direction.

Warpage refers to a phenomenon in which although a flat plate composed of a fiber-reinforced resin is produced such that two surfaces being in contact with a metal mold, the surface of the plate of the fiber-reinforced resin obtained after removal from the metal mold varies in thickness from one site to another rather than being a straight plane. A method of evaluating sink marks will be described with reference to FIG. 7 that is a schematic view of a cross-section of the fiber-reinforced resin in the thickness direction. The fiber-reinforced resin 11 is molded in the form of a flat plate with a length of 10 cm and a width of 10 cm using a metal mold, thicknesses (TH2 and TH3) of the fiber-reinforced resin 11 at the four corners are measured, and an arithmetic average (Tave) of the measured thicknesses is determined. A thickness TH1 (Tc) at an intersection of orthogonal lines from the four corners is measured. A thickness change ratio in the fiber-reinforced resin is determined from the following formula.

thickness change ratio (%)=($T$ave−$T$c)/$T$ave×100

Evaluation on sink marks on the fiber-reinforced resin was performed in three grades based on the following criteria. A sample rated "good" was considered as passing the evaluation.

good: the thickness change ratio is 10% or less (small sink marks).

fair: the thickness change ratio is more than 10% and 20% or less (large sink marks).

bad: the thickness change ratio is more than 20% (very large sink marks).

Reference Example 1

From a copolymer mainly composed of PAN, a carbon fiber bundle including total 12,000 monofilaments was prepared by performing spinning, a firing treatment and a surface oxidation treatment. The carbon fiber bundle had characteristics as shown below.

Monofilament diameter: 7 μm
Specific gravity: 1.8
Tensile strength: 4600 MPa
Tensile elastic modulus: 220 GPa Reference Example 2

An epoxy resin (epoxy-1) was prepared using 40 parts by mass of "jER (registered trademark)" 1007 (manufactured by Mitsubishi Chemical Corporation), 20 parts by mass of "jER (registered trademark)" 630 (manufactured by Mitsubishi Chemical Corporation), 40 parts by mass of "EPICLON (registered trademark)" 830 (manufactured by DIC Corporation), DICY7 (manufactured by Mitsubishi Chemical Corporation) as a curing agent in an amount of 0.9 equivalents in terms of active hydrogen groups based on the amount of epoxy groups in all the epoxy resin components, and 2 parts by mass of DCMU99 (manufactured by HODOGAYA CHEMICAL CO., LTD.) as a curing accelerator.

Using a reverse roll coater, the obtained epoxy resin (epoxy-1) was applied onto a release paper to prepare epoxy resin films with masses per unit area of 50 g/m$^2$, 200 g/m$^2$, 250 g/m$^2$, 400 g/m$^2$ and 750 g/m$^2$, respectively.

Reference Example 3

The carbon fibers obtained in Reference Example 1 were cut to a predetermined length by a cartridge cutter to prepare chopped carbon fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped carbon fibers. The production apparatus includes a cylindrical container as a dispersion tank which includes an opening cock in the lower part of the container and which has a diameter of 1000 mm; and a linear transportation section (inclination angle: 30 degrees) which connects the dispersion tank and a papermaking tank. A stirrer is attached to an opening section on the upper surface of the dispersion tank, and the chopped carbon fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a carbon fiber base material (papermaking base material) is connected to the mesh conveyor. In papermaking, the carbon fiber concentration in the dispersion liquid was adjusted to adjust the mass per unit area. About 5% by mass of a polyvinyl alcohol aqueous solution (KURARAY POVAL, manufactured by KURARAY CO., LTD.) as a binder was deposited on the carbon fiber base material subjected to papermaking, and was dried in a drying furnace at 140° C. for 1 hour to prepare a desired carbon fiber web. The mass per unit area was 100 g/m$^2$, the mean fiber length was 5.8 mm, the average of fiber two-dimensional orientation angles on the X-Y plane was 47.3°, the average of fiber two-dimensional orientation angles on a plane orthogonal to the X-Y plane was 80.7°, and the compressive stress (spring back force) of the carbon fiber web was 200 kPa. The carbon fiber web obtained here was designated as web-1.

Reference Example 4

Except that the carbon fiber concentration in the dispersion liquid was adjusted to change the mass per unit area to 200 g/m$^2$, the same procedure as in Reference Example 3 was carried out to prepare a carbon fiber web. In the obtained carbon fiber web, the mean fiber length was 5.8 mm, the average of fiber two-dimensional orientation angles on the X-Y plane was 46.8°, the average of fiber two-dimensional orientation angles on a plane orthogonal to the X-Y plane was 78.1°, and the compressive stress (spring back force) of the carbon fiber web was 200 kPa. The carbon fiber web obtained here was designated as web-2.

Reference Example 5

A carbon fiber fabric ("TORAYCA (registered trademark) Cloth, grade: CO6343B, plain fabric, weight per unit area of carbon fibers: 198 g/m$^2$, manufactured by Toray Industries, Inc.) was provided, and designated as a carbon fiber fabric (fabric-1).

Reference Example 6

The carbon fiber bundle obtained in Reference Example 1 was cut to a length of 25 mm by a cartridge cutter, and chopped strands thus obtained were stacked such that the mass per unit area was 200 g/m$^2$, thereby preparing a chopped strand mat. This was designated as a carbon fiber web (web-3).

Example 1

The carbon fiber web (web-1) obtained in Reference Example 3 was impregnated with the epoxy resin (epoxy-1) prepared in Reference Example 2 so that a resin supply material was prepared. The impregnation process includes the following steps.

First, one epoxy resin film (10 cm (length)×10 cm (width)) with a mass per unit area of 750 g/m$^2$ was disposed on each of front and back surfaces of a carbon fiber web (10 cm (length)×10 cm (width)) to produce a laminate.

The laminate obtained here was heated and pressurized at a pressure of 0.1 MPa and a metal mold surface temperature of 70° C. for 90 minutes by a press molding method to impregnate the continuous porous material with the resin, thereby preparing a resin supply material. The results of evaluating the obtained resin supply material are described in Table 2.

A preform was then prepared using the resin supply material obtained in the above-mentioned process and the carbon fiber fabric (fabric-1) as a base material, which was provided in Reference Example 5, and the preform was heated and pressurized to prepare a flat plate composed of a fiber-reinforced resin. The molding process includes the following steps.

One base material was laminated to each of front and back surfaces of a resin supply material (10 cm (length)×10 cm (width)) to prepare a preform, and the obtained preform was heated and pressurized at a pressure of 1 MPa and a metal mold surface temperature of 150° C. for 40 minutes by a press molding method to produce a flat plate composed of a fiber-reinforced resin. The results of evaluating the obtained fiber-reinforced resin are described in Table 2.

Example 2

Except that as a resin, an epoxy resin film with a mass per unit area of 400 g/m$^2$ was used in place of the epoxy resin film with a mass per unit area of 750 g/m$^2$, which was prepared in Reference Example 2, the same procedure as in Example 1 was carried out to produce and evaluate a resin supply material and a fiber-reinforced resin. The process conditions and evaluation results are described in Table 2.

Example 3

Except that as a resin, an epoxy resin film with a mass per unit area of 250 g/m$^2$ was used in place of the epoxy resin film with a mass per unit area of 750 g/m$^2$, which was prepared in Reference Example 2, the same procedure as in Example 1 was carried out to produce and evaluate a resin supply material and a fiber-reinforced resin. The process conditions and evaluation results are described in Table 2.

Example 4

Except that instead of disposing one epoxy resin film on each of front and back surfaces of the carbon fiber web, four carbon fiber webs and five epoxy resin films were alternately disposed to produce a resin supply material and, instead of laminating one base material on each of front and back surfaces of the resin supply material, five base materials were laminated on each of front and back surfaces of the resin supply material to produce a preform, the same procedure as in Example 1 was carried out to produce and evaluate a resin supply material and a fiber-reinforced resin. The process conditions and evaluation results are described in Table 2.

Example 5

Except that as a continuous porous material, the carbon fiber web (web-2) prepared in Reference Example 4 was used in place of the carbon fiber web (web-1) prepared in Reference Example 3, and as a resin, an epoxy resin film with a mass per unit area of 200 g/m$^2$ was used in place of the epoxy resin film with a mass per unit area of 750 g/m$^2$, which was prepared in Reference Example 2, the same procedure as in Example 1 was carried out to produce and evaluate a resin supply material and a fiber-reinforced resin. The process conditions and evaluation results are described in Table 2.

Comparative Example 1

An attempt was made to produce a fiber-reinforced resin in the same manner as in Example 5 except that a continuous porous material was not used, and two epoxy resin films with a mass per unit area of 200 g/m$^2$ were superimposed on each other, and used in place of the resin supply material. Resultantly, most of the resin flowed out of a metal mold in heating and pressurization, and thus it was unable to sufficiently impregnate the base material with the resin. The process conditions and evaluation results are described in Table 2.

Comparative Example 2

Except that the carbon fiber web (web-3) prepared in Reference Example 6 was used in place of the carbon fiber web (web-2), the same procedure as in Example 5 was carried out to produce and evaluate a resin supply material and a fiber-reinforced resin. The process conditions and evaluation results are described in Table 2.

Comparative Example 3

Except that the pressure in production of a resin supply material by a press molding method was changed from 0.1 MPa to 2.5 MPa, the same procedure as in Example 1 was carried out to produce and evaluate a resin supply material and a fiber-reinforced resin. The process conditions and evaluation results are described in Table 2.

Comparative Example 4

Except that as a continuous porous material, the carbon fiber web (web-2) prepared in Reference Example 4 was used in place of the carbon fiber web (web-1) prepared in Reference Example 3 and, as a resin, an epoxy resin film with a mass per unit area of 50 g/m² was used in place of the epoxy resin film with a mass per unit area of 750 g/m², which was prepared in Reference Example 2, the same procedure as in Example 1 was carried out to produce and evaluate a resin supply material and a fiber-reinforced resin, and instead of disposing one epoxy resin film was disposed on each of front and back surfaces of the carbon fiber web, two carbon fiber webs and three epoxy resin films were alternately disposed to produce a resin supply material, and the heating time in production of the resin supply material by a press molding method was changed from 90 minutes to 1 minute, the same procedure as in Example 1 was carried out to produce and evaluate a resin supply material and a fiber-reinforced resin. The process conditions and evaluation results are described in Table 2.

TABLE 2

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Resin supply material | | | | | | | | | | |
| Continuous porous material | Kind | web-1 | web-1 | web-1 | web-1 | web-2 | — | Web-3 | web-1 | web-2 |
| Resin | Kind | epoxy-1 | epoxy-1 | epoxy-1 | epoxy-1 | epoxy-1 | epoxy-1 | epoxy-1 | epoxy-1 | epoxy-1 |
| Method of producing resin supply material | | | | | | | | | | |
| Surface temperature of metal mold | ° C. | 70 | 70 | 70 | 70 | 70 | 70 | 70 | 70 | 70 |
| Pressure applied by metal mold | MPa | 0.1 | 0.1 | 0.1 | 0.1 | 0.1 | 0.1 | 0.1 | 2.5 | 0.1 |
| Time of pressure application by metal mold | minutes | 90 | 90 | 90 | 90 | 90 | 90 | 90 | 90 | 1 |
| Characteristics of resin supply material | | | | | | | | | | |
| Mass content of resin in resin supply material | % by mass | 94 | 89 | 83 | 90 | 67 | 100 | 67 | 53 | 27 |
| Thickness of resin supply material | mm | 1.3 | 0.7 | 0.5 | 3.3 | 0.4 | 0.3 | 0.4 | 0.15 | 2.8 |
| Variation (M) in mass content of resin in resin supply material | — | 0.03 | 0.03 | 0.03 | 0.03 | 0.05 | 0 | 0.40 | 0.24 | 0.30 |
| Variation (D) in specific gravity of resin supply material | — | 0.01 | 0.01 | 0.01 | 0.01 | 0.03 | 0 | 0.24 | 0.20 | 0.22 |
| Preform | | | | | | | | | | |
| Resin supply material | parts by mass | 100 | 100 | 100 | 100 | 100 | 100 | 100 | 100 | 100 |
| Base material | Kind | fabric-1 | fabric-1 | fabric-1 | fabric-1 | fabric-1 | fabric-1 | fabric-1 | fabric-1 | fabric-1 |
|  | parts by mass | 25 | 44 | 66 | 48 | 66 | 99 | 66 | 186 | 72 |
| Method of producing fiber-reinforced resin | | | | | | | | | | |
| Surface temperature of metal mold | ° C. | 150 | 150 | 150 | 150 | 150 | 150 | 150 | 150 | 150 |
| Pressure applied by metal mold | MPa | 1 | 1 | 1 | 1 | 1 | 1 | 1 | 1 | 1 |
| Time of pressure application by metal mold | minutes | 40 | 40 | 40 | 40 | 40 | 40 | 40 | 40 | 40 |
| Fiber-reinforced resin | | | | | | | | | | |
| Mass content of resin in core layer containing continuous porous material | % by mass | 81 | 77 | 76 | 78 | 55 | — | 58 | 53 | 21 |
| Mass content of resin in skin layer containing base material | % by mass | 24 | 28 | 24 | 54 | 22 | 39 | 40 | 0 | 10 |
| Variation (D') in specific gravity of core layer containing continuous porous material | — | 0.03 | 0.03 | 0.03 | 0.05 | 0.08 | — | 0.44 | 0.20 | 0.32 |
| Warpage of fiber-reinforced resin | — | good | good | good | good | good | bad | fair | bad | bad |
| Sink marks on fiber-reinforced resin | — | good | good | good | good | good | fair | bad | bad | bad |

Examples and Comparative Examples in Table 2 show the following.

Comparison of Examples 1 to 5 with Comparative Examples 1 to 4 shows that when the variation M in mass content of the resin in the resin supply material including a continuous porous material and a resin is controlled to fall within 0 to 0.1, external appearance defects of the resulting fiber-reinforced resin such as warpage and sink marks, can be considerably reduced.

Comparison of Examples 1 to 5 with Comparative Examples 1 to 4 shows that when the variation D in specific gravity of the resin supply material including a continuous porous material and a resin is controlled to fall within 0 to 0.1, external appearance defects of the resulting fiber-reinforced resin such as warpage and sink marks, can be considerably reduced.

Comparison of Examples 1 to 5 to Comparative Examples 2 to 4 shows that when the variation D' in specific gravity of the core layer containing a continuous porous material in the fiber-reinforced resin is controlled to fall within 0 to 0.1, external appearance defects of the resulting fiber-reinforced resin such as warpage and sink marks, can be considerably reduced.

Comparison among Examples 1 to 4 shows that when the variation M in mass content of the resin in the resin supply material is controlled to fall within 0 to 0.1, or the variation D in specific gravity of the resin supply material is controlled to fall within 0 to 0.1, a fiber-reinforced resin excellent in external appearance quality can be obtained even if the thickness of the resin supply material varies.

Third Construction

The resin supply material is a resin supply material including a continuous porous material and a resin. Such a resin supply material allows a fiber-reinforced resin to be produced by laminating the resin supply material with a base material to prepare a preform, heating and pressurizing the preform in, for example, a metal mold to supply a resin from the resin supply material to the base material. The resin serves as a matrix resin for the fiber-reinforced resin.

In a method of producing a fiber-reinforced resin using the resin supply material, it is preferred that a resin can be supplied from the resin supply material to the base material while generation of voids is prevented as much as possible and, therefore, it is preferred to use a press molding method or a vacuum-pressure molding method. A metal mold to be used may be a double-sided mold such as a closed mold composed of a rigid body, or a single-sided mold. In the latter case, a preform can also be disposed between a flexible film and a rigid open mold (where the preform is pressurized because a space between the flexible film and the rigid open mold is depressurized as compared to the outside).

The resin supply material includes a continuous porous material and a resin, and is preferably in the form of a sheet. The thickness of the sheet is preferably 0.5 mm or more, more preferably 1 mm or more, still more preferably 1.5 mm or more, particularly preferably 2 mm or more from the viewpoint of a resin supply characteristic and dynamic characteristics. Generally, a decrease in thickness of the resin supply material tends to cause gaps to be easily generated between the preform and the metal mold surface, leading to an increase in unevenness in surface roughness of the fiber-reinforced resin, but by using the resin supply material, a fiber-reinforced resin having reduced unevenness in surface roughness can be obtained even when the resin supply material has a small thickness within the above-mentioned range. From the viewpoint of a handling characteristic and moldability, the thickness of the sheet is preferably 100 mm or less, more preferably 60 mm or less, still more preferably 30 mm or less. Generally, an increase in thickness of the resin supply material tends to increase sink marks on the resulting fiber-reinforced resin, but by using the resin supply material, a fiber-reinforced resin having reduced sink marks can be obtained even when the resin supply material has a large thickness within the above-mentioned range.

In the resin supply material, a thickness change ratio T in the resin supply material as expressed by formula (I) is required to be more than 1 and 6 or less, and is preferably 2 to 6. When the thickness change ratio T in the resin supply material is 1 or less, gaps are easily generated between the preform and the metal mold surface in a process of producing a fiber-reinforced resin, resulting in occurrence of external appearance defects such as unevenness in surface roughness and sink marks in the fiber-reinforced resin. When the thickness change ratio T in the resin supply material is more than 6, gaps are easily generated between the preform and the metal mold surface, resulting in occurrence of external appearance defects such as unevenness in surface roughness in the fiber-reinforced resin.

The thickness change ratio T in the resin supply material is determined from formula (I).

$$T = Trt/Tri \qquad (I)$$

Tri: average of thicknesses of resin supply material just after supply of resin for obtaining fiber-reinforced resin Trt: average of thicknesses of resin supply material remaining in the resulting fiber-reinforced resin The thickness of the resin supply material can be determined by cutting out a material in each state, and observing a cross-section of the material in the thickness direction using an optical microscope. In a resin supply material sample just after supply of the resin for obtaining a fiber-reinforced resin, the thickness of the resin supply material can be determined by observation of a cross-section of the sample which is cooled and taken out such that the thickness is not changed in a state of completion of the process of impregnating the base material with a part of the resin in the resin supply material. The thickness of the resin supply material remaining in the fiber-reinforced resin can be determined by observation of a cross-section of the fiber-reinforced resin.

When the resin is solid at room temperature, the resin supply material may be cut with care taken to not crush the resin, and when the resin is liquid at room temperature, the resin supply material may be cut under a freezing condition. As the freezing condition, mention may be made of, for example, an atmosphere at a temperature lower by 10° C. or more than a melting point of the resin as determined by differential scanning calorimetry (DSC). If the melting point cannot be detected, mention may be made of, for example, a method in which the variation is determined using a glass transition temperature as the melting point.

The average here is a value determined by arithmetic averaging, and this value can be determined using the results of measuring the thickness at randomly selected 20 positions on the resin supply material.

A variation Tb in thickness of the resin supply material just after supply of the resin for obtaining a fiber-reinforced resin is preferably 0 to 0.1, more preferably 0 to 0.05, the variation Tb being expressed by formula (II). When the variation Tb in thickness of the resin supply material just after supply of the resin is more than 0.1, external appearance defects such as unevenness in surface roughness and sink marks occur in the fiber-reinforced resin.

The variation Tb in thickness of the resin supply material just after supply of the resin is determined from formula (II).

$$Tb = Tris/Tri \quad (II)$$

Tris: standard deviation of thicknesses of resin supply material just after supply of resin to obtain fiber-reinforced resin Tri represents an arithmetic average calculated from the same measurement results as those used in formula (I), and Tris represents a standard deviation calculated from the same measurement results as those used in calculation of Tri.

A variation Tc in thickness of the resin supply material remaining in the resulting fiber-reinforced resin is preferably 0 to 0.1, more preferably 0 to 0.05, the variation Tb being expressed by formula (III). When the variation Tc in thickness of the resin supply material remaining in the resulting fiber-reinforced resin is more than 0.1, external appearance defects such as unevenness in surface roughness and sink marks occur in the fiber-reinforced resin.

The variation Tc in thickness of the resin supply material remaining in the resulting fiber-reinforced resin is determined from formula (III).

$$Tc = Trts/Trt \quad (III)$$

Trts: standard deviation of thicknesses of resin supply material remaining in the resulting fiber-reinforced resin Trt represents an arithmetic average calculated from the same measurement results as those used in the above-mentioned formula (I), and Trts represents a standard deviation calculated from the same measurement results as those used in calculation of Trt.

The continuous porous material will now be described. The continuous porous material refers to a porous material in which included pores are mutually connected in a ratio at or above a certain level, and such a ratio may be, for example, 30 to 100% by volume in terms of a ratio of pores extending to the outer periphery of the porous material where the volume of the included pores is 100% by volume. The volume of such pores can be determined by a method in which the continuous porous material is photographed in observation by X-ray computerized tomography transmission. Specific examples of the continuous porous material include resin foams and cloths, but from the viewpoint of a balance between the handling characteristic of the resin supply material and the holding amount of the resin, it is preferred to use a cloth obtained from reinforcing fibers.

The reinforcing fiber will now be described. When a cloth obtained from reinforcing fibers is used as the continuous porous material, the reinforcing fiber to be used may be a continuous fiber used in a unidirectional base material, a fabric base material or the like, but the reinforcing fiber is preferably a discontinuous fiber from the viewpoint of a resin supply characteristic. The discontinuous fiber may be, for example, in a bundle shape or a monofilament shape, but the discontinuous fiber is preferably in the form of a web in which gaps more uniformly exist between the fibers. The form and the shape of the web are not limited and, for example, a plurality of reinforcing fibers may be mixed, reinforcing fibers may be sealed together by other component, or reinforcing fibers may be bonded to a resin component. As a preferred form to easily produce a web in which reinforcing fibers are dispersed, mention may be made of, for example, a base material in the form of a non-woven fabric obtained by a dry method or a wet method and in which reinforcing fibers are sufficiently opened, and monofilaments are bonded together by a binder composed of an organic compound.

From the viewpoint of production of the fiber-reinforced resin, the continuous porous material is preferably one in which a web composed of the reinforcing fibers has a specific fiber length, forms a strong network, and has high strength, and a spring back force as described later. Preferably, a web having high strength and a spring back force is used as a continuous porous material in the resin supply material because an excellent resin supply characteristic is attained, and the above-mentioned thickness change ratio T in the resin supply material, and a thickness change ratio T' in the base material as described later are easily controlled. The spring back force can be defined as a web compressive stress (spring back force) at a porosity of 90% in accordance with JIS K6400-2 (Hardness and Compressive Deflection—Method A-1, 2012). For the continuous porous material, the web compressive stress at a porosity of 90% is preferably 5 kPa or more, more preferably 50 kPa or more, still more preferably 100 kPa or more.

A thickness recovery ratio of the continuous porous material under conditions for production of a fiber-reinforced resin is preferably 70% to 150%, more preferably 80% to 110%. The thickness recovery ratio under conditions for production of a fiber-reinforced resin can be determined in accordance with the following formula from a thickness ($T_1$) of the continuous porous material, and a thickness ($T_2$) at the time of heating and pressurizing the continuous porous material under the same conditions as in the process of producing the fiber-reinforced resin, and then eliminating only the pressurization.

thickness recovery ratio (%) of continuous porous material = $T_2/T_1 \times 100$ Preferably, the thickness recovery ratio of the continuous porous material under conditions for production of a fiber-reinforced resin is controlled to fall within the above-mentioned range because uniformity of the amount of the resin supplied to the base material can be improved, and the external appearance quality of the resulting fiber-reinforced resin can be improved.

As a kind of reinforcing fibers, carbon fibers are preferred, but the reinforcing fibers may be glass fibers, aramid fibers, metal fibers or the like. The carbon fibers are not particularly limited and, for example, polyacrylonitrile (PAN)-based carbon fibers, pitch-based carbon fibers and rayon-based carbon fibers can be preferably used from the viewpoint of an effect of reducing the weight of the fiber-reinforced resin. One kind of the carbon fibers, or a combination of two or more kinds of the carbon fibers may be used. Among them, PAN-based carbon fibers are further preferred from the viewpoint of a balance between the strength and the elastic modulus of the resulting fiber-reinforced resin. The monofilament diameter of the reinforcing fibers is preferably 0.5 µm or more, more preferably 2 µm or more, still more preferably 4 µm or more. The monofilament diameter of the reinforcing fibers is preferably 20 µm or less, more preferably 15 µm or less, still more preferably 10 µm or less. The strand strength of the reinforcing fibers is preferably 3 GPa or more, more preferably 4 GPa or more, still more preferably 4.5 GPa or more. The strand elastic modulus of the reinforcing fibers is preferably 200 GPa or more, more preferably 220 GPa or more, still more preferably 240 GPa or more. When the strand strength or the elastic modulus of the reinforcing fibers are less than 3 GPa or less than 200

GPa, respectively, it may be unable to obtain desired characteristics as a fiber-reinforced resin.

The mean fiber length of the reinforcing fibers is preferably 0.1 mm or more, more preferably 1 mm or more, still more preferably 2 mm or more. The mean fiber length of the reinforcing fibers is preferably 100 mm or less, more preferably 50 mm or less, still more preferably 10 mm or less. Examples of the method of measuring the mean fiber length include a method in which reinforcing fibers are directly extracted from a continuous porous material, and measured by microscopic observation; and a method in which a resin in a resin supply material is dissolved using a solvent capable of dissolving only the resin, the remaining reinforcing fibers are separated by filtration, and measured by microscopic observation (dissolution method). When a solvent capable of dissolving a resin is not available, mention is made of, for example, a method in which only the resin is burned off in a temperature range over which the oxidative weight loss of reinforcing fibers does not occur, and the reinforcing fibers are separated, and measured by microscopic observation (burning method). The measurement can be performed by randomly selecting 400 reinforcing fibers, measuring the lengths of the reinforcing fibers to the order of 1 μm using an optical microscope, and determining fiber lengths and ratios thereof. In a comparison between the method in which reinforcing fibers are directly extracted from a continuous porous material and the method in which reinforcing fibers are extracted from a resin supply material by a burning method or a dissolution method, there is no significant difference between the results obtained by the former method and the latter method as long as conditions are appropriately selected.

Preferably, the orientation of fibers on an X-Y plane of the web (the X-Y plane is in a base material plane and an axis orthogonal to a certain axis (X axis) in the base material plane is a Y axis, and an axis extending in a thickness direction of the base material (i.e., a direction vertical to the base material plane) is a Z axis) has high isotropy. An average of fiber two-dimensional orientation angles on the X-Y plane as measured by a measurement method as described later is preferably 5 degrees or more, more preferably 20 degrees or more, still more preferably 30 degrees or more. The closer to the ideal angle: 45 degrees, the better. When the average of fiber two-dimensional orientation angles is less than 5 degrees, it may be necessary to consider a lamination configuration of the resin supply material because the fiber orientation is significantly biased in a specific direction so that dynamic characteristics significantly vary depending on the direction.

An average of fiber two-dimensional orientation angles on a plane orthogonal to the X-Y plane of the web as measured by a measurement method as described later is preferably 5 degrees or more, more preferably 10 degrees or more, still more preferably 20 degrees or more for improving the resin support characteristic. The average of fiber two-dimensional orientation angles on the plane orthogonal to the X-Y plane of the web is preferably 85 degrees or less, more preferably 80 degrees or less, still more preferably 75 degrees or less. When the average of fiber two-dimensional orientation angles on a plane orthogonal to the X-Y plane of the web is less than 5 degrees, or more than 85 degrees, the distances between fibers may decrease, resulting in deterioration of the resin support characteristic.

The mass per unit area of a web composed of reinforcing fibers that are used as a continuous porous material is preferably 1 g/m² or more, more preferably 10 g/m² or more, still more preferably 30 g/m² or more. When the mass per unit area is less than 1 g/m², the resin support characteristic may be deteriorated, thus making it unable to secure a resin amount required for production of the fiber-reinforced resin. Further, in the process of producing the web or the resin supply material, the handling characteristic may be poor, leading to deterioration of workability.

It is preferred that fibers in the web composed of reinforcing fibers that are used as a continuous porous material are bonded together by a binder. Accordingly, the handling characteristic and productivity of the web, and workability are improved, and the network structure of the web can be retained. The binder is not particularly limited, and examples of the binder that is preferably used include thermoplastic resins such as polyvinyl alcohol, ethylene-propylene copolymers, ethylene-vinyl acetate copolymers, polyvinyl chloride, polyvinylidene chloride, polyvinyl acetate, polycarbonate resins, styrene-based resins, polyamide-based resins, polyester-based resins, polyphenylene sulfide resins, modified polyphenylene ether resins, polyacetal resins, polyetherimide resins, polypropylene resins, polyethylene resins, fluororesins, thermoplastic acrylic resins, thermoplastic polyester resins, thermoplastic polyamideimide resins, acrylonitrile-butadiene copolymers, styrene-butadiene copolymers and acrylonitrile-styrene-butadiene copolymers; and thermosetting resins such as urethane resins, melamine resins, urea resins, thermosetting acrylic resins, phenol resins, epoxy resins and thermosetting polyester. A resin having at least one functional group selected from an epoxy group, a hydroxy group, an acrylate group, a methacrylate group, an amide group, a carboxyl group, an acid anhydride group, an amino group and an imino group is preferably used from the viewpoint of the dynamic characteristics of the resulting fiber-reinforced resin. These binders may be used alone, or in combination of two or more thereof. The attaching amount of the binder is preferably 0.01% by mass or more, more preferably 0.1% by mass or more, still more preferably 1% by mass or more based on the mass of reinforcing fibers loaded with the binder. The attaching amount of the binder is preferably 20% by mass or less, more preferably 15% by mass or less, still more preferably 10% by mass or less based on the mass of reinforcing fibers on which the binder is deposited. When the attaching amount of the binder is more than 20% by mass, resin impregnability may be deteriorated. When the attaching amount of the binder is less than 0.01% by mass, it may be difficult to maintain the form of a web composed of reinforcing fibers, leading to deterioration of the handling characteristic. A method of measuring the attaching amount of the binder will be described later.

The resin will now be described. The viscosity of the resin during impregnation of the resin into the continuous porous material is preferably 1000 Pa·s or less, more preferably 100 Pa·s or less, still more preferably 10 Pa·s or less. When the viscosity of the resin is more than 1000 Pa·s, a base material as described later cannot be sufficiently impregnated with the resin, and thus it may be unable to control the above-mentioned thickness change ratio T in the resin supply material and the later-described thickness change ratio T' in the base material.

The kind of resin may be, for example, a thermosetting resin or a thermoplastic resin. As the thermosetting resin, at least one selected from an epoxy resin, a vinyl ester resin, a phenol resin, a thermosetting polyimide resin, a polyurethane resin, a urea resin, a melamine resin and a bismaleimide resin. Among these thermosetting resins, an epoxy resin is particularly preferred from the viewpoint of a balance between the temporal stability of the resin supply material and the dynamic characteristics of the resulting fiber-reinforced resin. The epoxy resin can be used not only singly, but also in the form of a copolymer with a thermosetting resin, a modified product and a blend of two or more resins, each of which is mainly composed of an epoxy resin. As the thermoplastic resin, at least one selected from polypropylene, polyethylene, polycarbonate, polyamide, polyester, polyarylene sulfide, polyphenylene sulfide, polyether ketone, polyether ether ketone, polyether ketone ketone, polyether sulfone, polyimide, polyamideimide, polyether imide and polysulfone, or a cyclic oligomer that is a precursor of any of these resins is preferably used.

The preform includes a resin supply material and a base material.

The base material to be used in the preform is a fiber base material composed of reinforcing fibers, and is preferably a fabric base material, a unidirectional base material or a mat base material composed of reinforcing fibers. For obtaining a fiber-reinforced resin having high dynamic characteristics, it is preferred that a fabric base material or unidirectional base material composed of continuous reinforcing fibers is used as the base material, and for increasing the resin impregnation rate to improve productivity of the fiber-reinforced resin, it is preferred that a mat base material composed of discontinuous fibers is used as the base material.

The form and the arrangement of reinforcing fibers to be used in the base material can be appropriately selected from continuous fiber forms such as a unidirectionally drawn and aligned long fiber, a fabric, a tow and a roving. Usually, the base material does not contain a matrix resin, i.e., the base material is in a dry state.

As continuous reinforcing fibers and discontinuous fibers in the base material, the same kind of fibers as those shown as an example of reinforcing fibers to be used in the continuous porous material can be preferably used.

The base material is used to form a preform together with the resin supply material. The preform means a laminate obtained by laminating and integrating the resin supply material and the base material, and examples thereof may include a sandwich laminate in which an outermost layer of a laminate obtained by laminating and integrating a predetermined number of resin supply materials is sandwiched between base materials; an alternating laminate in which resin supply materials and base materials are alternately laminated; and a combination thereof. Formation of a preform beforehand is preferred because the base material can be quickly and more uniformly impregnated with a resin in a process of producing a fiber-reinforced resin.

Examples of the method of producing a fiber-reinforced resin using the resin supply material include a method in which a fiber-reinforced resin is molded by heating and pressurizing the preform in a metal mold. First, a preform including a resin supply material and a base material is prepared, and set on a metal mold. The preform is heated with the metal mold to soften the resin supply material, and then pressurized to supply to a resin to the base material and impregnate the base material with the resin. Examples of the pressurization method may include a press molding method and a vacuum-pressure molding method, and a press molding method is preferred from the viewpoint of productivity and external appearance of the resulting fiber-reinforced resin. In a method of producing a fiber-reinforced resin using a press molding method, the mold for molding is preferably a closed double-sided mold composed of a rigid body, and it is preferred to use a metallic mold that meets such a requirement. When the resin is a thermosetting resin, the thermosetting resin is cured by heating during molding so that a fiber-reinforced resin is obtained. When the resin is a thermoplastic resin, the resin melted by heating during molding is cooled to solidify the resin so that a fiber-reinforced resin is obtained.

The surface temperature of the metal mold in the method of producing a fiber-reinforced resin is preferably 50° C. to 450° C. When the resin is a thermosetting resin, it is preferred to divide the method into a first process intended for impregnating the base material with the resin and a second process intended for curing the resin, from the viewpoint of improving the external appearance quality of the fiber-reinforced resin. In this case, the surface temperature of a metal mold in the first process is more preferably 50° C. to 100° C., still more preferably 60° C. to 80° C. The surface temperature of a metal mold in the second process is more preferably 100° C. to 200° C., still more preferably 120° C. to 160° C. Preferably, the surface temperatures of the metal molds in the first process and the second process are controlled to fall within the above-mentioned ranges, respectively because the base material can be impregnated with the resin selectively so that the external appearance quality of the resulting fiber-reinforced resin can be improved.

When the resin is a thermoplastic resin, the temperature during supply of the resin is preferably higher than the melting point of the resin by 10° C. or more. While such a temperature depends on the kind of resin, the surface temperature of the metal mold is preferably 150° C. to 450° C., more preferably 150° C. to 300° C. After the resin is supplied and before the fiber-reinforced resin is taken out, the surface temperature of the metal mold is preferably lower than the melting point of the resin by 10° C. or more, more preferably by 30° C. or more, still more preferably by 50° C. or more.

The pressure applied by the metal mold in the method of producing a fiber-reinforced resin is preferably 0.01 MPa to 20 MPa. When the resin is a thermosetting resin, it is preferred to divide the method into a first process intended to impregnate the base material with the resin and a second process intended to cure the resin, from the viewpoint of improving the external appearance quality of the fiber-reinforced resin. In this case, the pressure applied by the metal mold in the first process is more preferably 0.01 MPa to 5 MPa, still more preferably 0.01 MPa to 0.5 MPa. The pressure applied by the metal mold in the second process is more preferably 0.01 MPa to 20 MPa, still more preferably 0.01 MPa to 5 MPa. It is preferred that in the second process, a spacer having a predetermined thickness is also pressurized to adjust the thickness of the resulting fiber-reinforced resin. Preferably, the pressures from the metal molds in the first process and the second process are controlled to fall within the above-mentioned ranges, respectively because the external appearance quality of the resulting fiber-reinforced resin can be improved.

When the resin is a thermoplastic resin, the pressures applied by the metal mold in supply of the resin and in the process of reducing the surface temperature of the metal mold before taking out the fiber-reinforced resin are preferably the same for improving the external appearance quality of the fiber-reinforced resin.

The fiber-reinforced resin can be produced by forming a preform including a resin supply material and a base material, and heating and pressuring the preform to mold the preform. Since a part of the resin held by the resin supply material is supplied to the base material due to heating and pressurization, the resulting fiber-reinforced resin 11 includes a core layer 12 containing a continuous porous material, and a skin layer 13 containing a base material as shown in FIGS. 4 and 5. The core layer containing a continuous porous material refers to the continuous porous material after a part of the resin held by the resin supply material is supplied to the base material, and the skin layer containing a base material refers to the base material impregnated with the resin.

In the preform, the thickness change ratio T' in the base material as expressed by formula (IV) is preferably 0.5 to 1.5, more preferably 0.85 to 1.05. When the thickness change ratio T' in the base material is less than 0.5, the amount of the resin in the skin layer containing the base material is insufficient so that a part of the base material is exposed, resulting in occurrence of external appearance defects such as unevenness in surface roughness in the fiber-reinforced resin. When the thickness change ratio T' in the base material is more than 1.5, the skin layer includes a large number of pores, resulting in occurrence of external appearance defects such as unevenness in surface roughness in the fiber-reinforced resin.

The thickness change ratio T' in the base material is determined from formula (IV).

$$T' = T'rt/T'ri \quad (IV)$$

T'ri: average of thicknesses of base material just after supply of resin

T'rt: average of thicknesses of base material remaining in the resulting fiber-reinforced resin The thickness of the base material can be determined by cutting out a material in each state, and observing a cross-section of the material in the thickness direction using an optical microscope. In a base material sample just after supply of the resin, the thickness of the resin supply material can be determined by observation of a cross-section of the sample which is cooled and taken out such that the thickness is not changed in a state of completion of the process of impregnating the base material with a part of the resin in the resin supply material. The thickness of the base material remaining in the fiber-reinforced resin can be determined by observation of a cross-section of the fiber-reinforced resin.

When the resin is solid at room temperature, the resin supply material may be cut with care taken not to crush the resin, and when the resin is liquid at room temperature, the resin supply material may be cut under a freezing condition. As the freezing condition, mention may be made of, for example, an atmosphere at a temperature lower by 10° C. or more than a melting point of the resin as determined by differential scanning calorimetry (DSC). If the melting point cannot be detected, mention may be made of, for example, a method in which the variation is determined using a glass transition temperature as the melting point.

The average here is a value determined by arithmetic averaging, and this value can be determined using the results of measuring the thickness at randomly selected 20 positions on the base material.

In the resin supply material, the mass content of the resin held by the resin supply material is preferably 30% by mass to 99.5% by mass, more preferably 30% by mass to 95% by mass, still more preferably 60% by mass to 95% by mass based on 100% by mass of the resin supply material. It is preferred that the mass content of the resin held by the resin supply material is within the above-mentioned range because all of the handling characteristic of the resin supply material, a high holding amount of the resin and uniformity of the amount of the resin supplied to the base material are secured.

In the preform, the content of the base material is preferably 0.1 parts by mass to 300 parts by mass, more preferably 20 parts by mass to 100 parts by mass, still more preferably 20 parts by mass to 80 parts by mass based on 100 parts by mass of the resin supply material in the preform. It is preferred that the content of the base material is within the above-mentioned range because uniformity of the amount of the resin supplied to the base material can be controlled so that the incidence of external appearance defects of the fiber-reinforced resin such as unevenness in surface roughness and sink marks, can be reduced.

Method of Deriving Average of Fiber Two-Dimensional Orientation Angles on X-Y Plane The average of fiber two-dimensional orientation angles on the X-Y plane is measured in the following steps I-1 and I-2. As described above, the X axis, the Y axis and the Z axis are mutually orthogonal, the X-Y plane is in the base material plane, and the Z axis extends in the thickness direction of the base material.

I-1. An average of two-dimensional orientation angles with all reinforcing fiber monofilaments orthogonally crossing randomly selected reinforcing fiber monofilaments on the X-Y plane is measured. If there are many reinforcing fiber monofilaments crossing the reinforcing fiber monofilaments, an average measured for randomly selected 20 crossing reinforcing fiber monofilaments may be used alternatively.

I-2. The measurement in the step I-1 is repeated five times in total for other reinforcing fiber monofilaments, and an average of the measured values is calculated as an average of fiber two-dimensional orientation angles.

The method of measuring an average of fiber two-dimensional orientation angles from the resin supply material is not particularly limited, and mention may be made of, for example, a method in which the orientation of reinforcing fibers is observed from a surface of the resin supply material. It is preferred to polish the surface of the resin supply material to expose the fibers for more easily observing the reinforcing fibers. Mention may also be made of, for example, a method in which the orientation of reinforcing fibers is observed using light passing through the resin supply material. It is preferred to thinly slice the resin supply material for more easily observing the reinforcing fibers. Mention may also be made of, for example, a method in which the resin supply material is observed by X-ray computerized tomography transmission, and an image of oriented reinforcing fibers is taken. In reinforcing fibers having high X-ray transparency, it is preferred to mix tracer fibers with the reinforcing fibers or apply a tracer chemical to the reinforcing fibers for more easily observing the reinforcing fibers.

When it is difficult to perform measurement by the above-mentioned methods, mention may be made of, for example, a method in which the orientation of reinforcing fibers is observed after a resin is removed without collapsing the structure of the reinforcing fibers. For example, measurement can be performed in the following manner: the resin supply material is sandwiched between two stainless meshes, and fixed by a screw or the like so that the resin supply material does not move, a resin component is then burned off, and the resulting reinforcing fiber base material is observed with an optical microscope or an electron microscope.

Method of Deriving Average of Fiber Two-Dimensional Orientation Angles on Plane Orthogonal to X-Y Plane The average of fiber two-dimensional orientation angles on a plane to the X-Y plane is measured in the following steps II-1 and II-2.

II-1. Fiber two-dimensional orientation angles of randomly selected reinforcing fiber monofilaments on a plane orthogonal to the X-Y plane are measured. The fiber two-dimensional orientation angle is set to 0 degree when parallel to the Z axis, and to 90 degrees when vertical to the Z axis. Accordingly, the fiber two-dimensional orientation angle ranges from 0 degree to 90 degrees.

II-2. The measurement in the step II-1 is performed for total 50 reinforcing fiber monofilaments, and an average of the measured values is calculated as an average of fiber two-dimensional orientation angles on a plane orthogonal to the X-Y plane.

The method of measuring an average of fiber inclination angles from the resin supply material is not particularly limited, and mention may be made of, for example, a method in which the orientation of reinforcing fibers is observed from the Y-Z plane (Z-X plane) of the resin supply material. It is preferred to polish a cross-section of the resin supply material to expose the fibers for more easily observing the reinforcing fibers. Mention may also be made of, for example, a method in which the orientation of reinforcing fibers is observed using light passing through the resin supply material. It is preferred to thinly slice the resin supply material for more easily observing the reinforcing fibers. Mention may also be made of, for example, a method in which the resin supply material is observed by X-ray computerized tomography transmission, and an image of oriented reinforcing fibers is taken. In reinforcing fibers having high X-ray transparency, it is preferred to mix tracer fibers with the reinforcing fibers or apply a tracer chemical to the reinforcing fibers for more easily observing the reinforcing fibers.

Method of Measuring Attaching Amount of Binder

Reinforcing fibers loaded with a binder are weighed ($W_1$), and then left standing for 15 minutes in an electric furnace set at a temperature of 450° C. in a nitrogen flow at a rate of 50 liters/minute so that the binder is fully thermally decomposed. The reinforcing fibers are transferred to a container in a dry nitrogen flow at 20 liters/minute, cooled for 15 minutes, and then weighed ($W_2$), and a binder attaching amount is determined from the following formula.

binder attaching amount (% by mass)=$(W_1-W_2)/W_1 \times 100$

EXAMPLES

Hereinafter, our materials, preforms and methods will be described further in detail by way of examples. First, measurement methods will be described below.

(1) Evaluation on Thickness Change Ratio in Resin Supply Material

The thickness change ratio T in the resin supply material is determined from formula (I).

$$T=Trt/Tri \qquad (I)$$

Tri: average of thicknesses of resin supply material just after supply of resin for obtaining fiber-reinforced resin Trt: average of thicknesses of resin supply material remaining in the resulting fiber-reinforced resin As a sample to measure the thickness of the resin supply material just after supply of the resin, an intermediate obtained in the first process of impregnating the base material with the resin in each of examples and comparative examples can be used.

As a sample to measure the thickness of the resin supply material remaining in the resulting fiber-reinforced resin, the fiber-reinforced resin obtained in each of examples and comparative examples can be used.

The cut surface of each sample is magnified by 50 times with an optical microscope, and the thickness thereof is read to the order of 0.1 mm to measure the thickness of the resin supply material.

The average here is a value determined by arithmetic averaging, and this value can be determined using the results of measuring the thickness at randomly selected 20 positions on the resin supply material.

(2) Evaluation on Variation in Thickness of Resin Supply Material Just After Supply of Resin The variation Tb in thickness of the resin supply material just after supply of the resin is expressed by formula (II).

$$Tb=Tris/Tri \qquad (II)$$

Tris: standard deviation of thicknesses of resin supply material just after supply of resin to obtain fiber-reinforced resin Tri represents an arithmetic average calculated from the same measurement results as those used in formula (I) in the evaluation method (1), and Tris represents a standard deviation calculated from the same measurement results as those used in calculation of Tri.

(3) Evaluation on Variation in Thicknesses of Resin Supply Material Remaining in Fiber-Reinforced Resin The variation Tc in thickness of the resin supply material remaining in the resulting fiber-reinforced resin is determined from formula (III).

$$Tc=Trts/Trt \qquad (III)$$

Trts: standard deviation of thicknesses of resin supply material remaining in the resulting fiber-reinforced resin Trt represents an arithmetic average calculated from the same measurement results as those used in formula (I) in evaluation method (1), and Trts represents a standard deviation calculated from the same measurement results as those used in calculation of Trt.

(4) Evaluation on Thickness Change Ratio in Base Material

The thickness change ratio T' in the base material is determined from formula (IV).

$$T'=T'rt/T'ri \qquad (IV)$$

T'ri: average of thicknesses of base material just after supply of resin

T'rt: average of thicknesses of base material remaining in the resulting fiber-reinforced resin As a sample to measure the thickness of the base material just after supply of the resin, an intermediate obtained in the first process of impregnating the base material with the resin in each of examples and comparative examples can be used.

As a sample to measure the thickness of the base material remaining in the resulting fiber-reinforced resin, the fiber-reinforced resin obtained in each of examples and comparative examples can be used.

The cut surface of each sample is magnified by 50 times with an optical microscope, and the thickness thereof is read to the order of 0.1 mm to measure the thickness of the base material.

The average here is a value determined by arithmetic averaging, and this value can be determined using the results of measuring the thickness at randomly selected 20 positions on the base material.

(5) Evaluation on Unevenness in Surface Roughness of Fiber-Reinforced Resin

Figure 8:
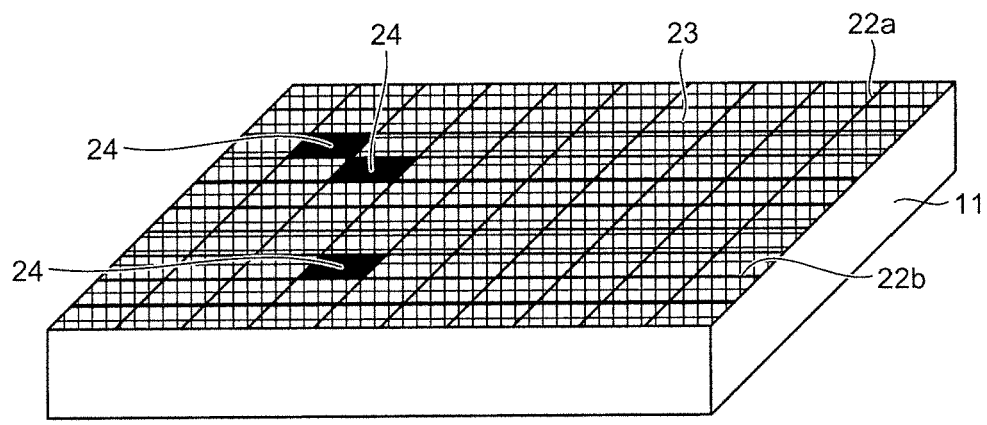
FIG. 8 is a schematic view showing a configuration of a fiber-reinforced resin.

The unevenness in surface roughness refers to a phenomenon in which the external surface of the fiber-reinforced resin has portions having extremely different surface roughnesses. A method of evaluating surface roughness will be described with reference to FIG. 8 that is a schematic view of the fiber-reinforced resin. First, the external surface of the fiber-reinforced resin 11 molded in the form of a flat plate with a length of 10 cm and a width of 10 cm using a metal mold subjected to #800 mirror finishing is partitioned by grid lines 22a and 22b with intervals of 1 cm×1 cm, and for each grid, an arithmetic mean surface roughness (Ra) is determined in accordance with JIS B0601 (2013). An arithmetic average of the arithmetic mean surface roughnesses Ra of the grids is determined, and grids 23 having an arithmetic mean surface roughness Ra that falls within ±30% of the arithmetic average are discriminated from grids 24 having an arithmetic mean surface roughness Ra that falls out of ±30% of the arithmetic average.

Evaluation on unevenness in surface roughness of the fiber-reinforced resin was performed in three grades based on the following criteria. A sample rated "good" was considered as passing the evaluation.
  good: the number of grids having an arithmetic mean surface roughness Ra that falls out of ±30% of the arithmetic average of the arithmetic mean surface roughnesses Ra of the grids is 0 to 1 (small unevenness in surface roughness).
  fair: the number of grids having an arithmetic mean surface roughness Ra that falls out of ±30% of the arithmetic average of the arithmetic mean surface roughnesses Ra of the grids is 2 to 4 (large unevenness in surface roughness).
  bad: the number of grids having an arithmetic mean surface roughness Ra that falls out of ±30% of the arithmetic average of the arithmetic mean surface roughnesses Ra of the grids is 5 or more (very large unevenness in surface roughness).

(6) Evaluation on Sink Marks on Fiber-Reinforced Resin

Warpage refers to a phenomenon in which although a flat plate composed of a fiber-reinforced resin is produced such that two surfaces being in contact with a metal mold, the surface of the plate of the fiber-reinforced resin obtained after removal from the metal mold varies in thickness from one site to another rather than being a straight plane. A method of evaluating sink marks will be described with reference to FIG. 7 that is a schematic view of a cross-section of the fiber-reinforced resin in the thickness direction. The fiber-reinforced resin 11 is molded in the form of a flat plate with a length of 10 cm and a width of 10 cm using a metal mold, thicknesses (TH2 and TH3) of the fiber-reinforced resin 11 at the four corners are measured, and an arithmetic average (Tave) of the measured thicknesses is determined. A thickness TH1 (Tc) at an intersection of orthogonal lines from the four corners is measured. A sink mark ratio in the fiber-reinforced resin is determined from the following formula.

sink mark ratio (%) in fiber-reinforced resin=(Tave−Tc)/Tave×100

Evaluation on sink marks on the fiber-reinforced resin was performed in three grades based on the following criteria. A sample rated "good" was considered as passing the evaluation.
  good: the sink mark ratio in the fiber-reinforced resin is 10% or less (small sink marks).
  fair: the sink mark ratio in the fiber-reinforced resin is more than 10% and 20% or less (large sink marks).
  bad: the sink mark ratio in the fiber-reinforced resin is more than 20% (very large sink marks).

(7) Measurement of Thickness of Resin Supply Material or Fiber-Reinforced Resin

The thickness of the resulting resin supply material or fiber-reinforced resin is an average of thicknesses of one sample measured using a caliper. The average here is a value determined by arithmetic averaging, and this value can be determined using the results of measuring the thickness at randomly selected 20 positions on the resin supply material or the fiber-reinforced resin.

Reference Example 1

From a copolymer mainly composed of PAN, a carbon fiber bundle including total 12,000 monofilaments was prepared by performing spinning, a firing treatment and a surface oxidation treatment. The carbon fiber bundle had characteristics as shown below.
  Monofilament diameter: 7 μm
  Specific gravity: 1.8
  Tensile strength: 4600 MPa
  Tensile elastic modulus: 220 GPa Reference Example 2

An epoxy resin (epoxy-1) was prepared using 40 parts by mass of "jER (registered trademark)" 1007 (manufactured by Mitsubishi Chemical Corporation), 20 parts by mass of "jER (registered trademark)" 630, 40 parts by mass of "EPICLON (registered trademark)" 830 (manufactured by DIC Corporation), DICY7 (manufactured by Mitsubishi Chemical Corporation) as a curing agent in an amount of 0.9 equivalents in terms of active hydrogen groups based on the amount of epoxy groups in all the epoxy resin components, and 2 parts by mass of DCMU99 (manufactured by HODOGAYA CHEMICAL CO., LTD.) as a curing accelerator.

Using a reverse roll coater, the obtained epoxy resin (epoxy-1) was applied onto a release paper to prepare an epoxy resin film with a mass per unit area of 375 g/m$^2$.

Reference Example 3

The carbon fibers obtained in Reference Example 1 were cut to a predetermined length by a cartridge cutter to prepare chopped carbon fibers. A dispersion liquid including water and a surfactant (Polyoxyethylene Lauryl Ether (brand name), manufactured by NACALAI TESQUE, INC.) and having a concentration of 0.1% by mass was prepared, and a papermaking base material was produced by a production apparatus for papermaking base materials using the dispersion liquid and the chopped carbon fibers. The production apparatus includes a cylindrical container as a dispersion tank including an opening cock in the lower part of the container and having a diameter of 1000 mm; and a linear transportation section (inclination angle: 30 degrees) that connects the dispersion tank and a papermaking tank. A stirrer is attached to an opening section on the upper surface of the dispersion tank, and the chopped carbon fibers and the dispersion liquid (dispersion medium) can be introduced to the stirrer through the opening section. The papermaking tank is a tank including a mesh conveyor having a 500 mm-wide papermaking surface on the bottom, and a conveyor capable of conveying a carbon fiber base material (papermaking base material) is connected to the mesh conveyor. In papermaking, the carbon fiber concentration in the dispersion liquid was adjusted to adjust the mass per unit area. About 5% by mass of a polyvinyl alcohol aqueous solution (KURARAY POVAL, manufactured by KURARAY CO., LTD.) as a binder was deposited on the carbon fiber base material subjected to papermaking, and was dried in a drying furnace at 140° C. for 1 hour to prepare a desired carbon fiber web. The mass per unit area was 100 g/m$^2$, the mean fiber length was 5.8 mm, the average of fiber two-dimensional orientation angles on the X-Y plane was 47.3°, the average of fiber two-dimensional orientation angles on a plane orthogonal to the X-Y plane was 80.7°, and the compressive stress (spring back force) of the carbon fiber web was 200 kPa. The carbon fiber web obtained here was designated as a continuous porous material (web-1).

The obtained continuous porous material (web-1) was measured under the condition of a metal mold surface temperature of 70° C. and an applied pressure of 1 MPa, and the result showed that the continuous porous material had a thickness recovery ratio of 98%. Further, the continuous porous material was measured under the condition of a metal mold surface temperature of 150° C. and an applied pressure of 0.1 MPa. The result showed that the continuous porous material had a thickness recovery ratio of 99%.

Reference Example 4

The carbon fiber bundle obtained in Reference Example 1 was cut to a length of 25 mm by a cartridge cutter, and chopped strands thus obtained were stacked such that the mass per unit area was 100 g/m$^2$, thereby preparing a chopped strand mat. The chopped strand mat was designated as a continuous porous material (web-2).

The obtained continuous porous material (web-2) was measured under the condition of a metal mold surface temperature of 70° C. and an applied pressure of 1 MPa, and the result showed that the continuous porous material had a thickness recovery ratio of 48%. Further, the continuous porous material was measured under the condition of a metal mold surface temperature of 150° C. and an applied pressure of 0.1 MPa. The result showed that the continuous porous material had a thickness recovery ratio of 65%.

Reference Example 5

A carbon fiber fabric ("TORAYCA (registered trademark) Cloth, grade: CO6343B, plain fabric, weight per unit area of carbon fibers: 198 g/m$^2$, manufactured by Toray Industries, Inc.) was provided, and designated as fabric-1.

Reference Example 6

A polypropylene non-woven fabric (weight per unit area: 100 g/m$^2$, thickness: 0.58 mm) was prepared using polypropylene ("Prime Polypro (registered trademark)" J704UG, manufactured by Prime Polymer Co., Ltd.), and this polypropylene non-woven fabric was designated as a continuous porous material (web-3).

The obtained continuous porous material (web-3) was measured under the condition of a metal mold surface temperature of 70° C. and an applied pressure of 1 MPa, and the result showed that the continuous porous material had a thickness recovery ratio of 60%. Further, the continuous porous material was measured under the condition of a metal mold surface temperature of 150° C. and an applied pressure of 0.1 MPa. The result showed that the continuous porous material had a thickness recovery ratio of 12%.

Example 1

The continuous porous material (web-1) obtained in Reference Example 3 was impregnated with the epoxy resin (epoxy-1) prepared in Reference Example 2 so that a resin supply material was prepared. The impregnation process includes the following steps.

First, three continuous porous materials (10 cm (length)× 10 cm (width)) and four epoxy resin films (10 cm (length)× 10 cm (width)) were alternately laminated to produce a laminate.

The laminate obtained here was heated and pressurized at a pressure of 0.1 MPa and a metal mold surface temperature of 70° C. for 90 minutes by a press molding method to impregnate the continuous porous material with the resin, thereby preparing a resin supply material. The results of evaluating the obtained resin supply material are described in Table 3.

A preform was then prepared using the resin supply material obtained in the above-mentioned process and the carbon fiber fabric (fabric-1) as a base material, which was provided in Reference Example 5, and the preform was heated and pressurized to prepare a flat plate composed of a fiber-reinforced resin. The molding process includes the following steps.

One base material was laminated to each of front and back surfaces of a resin supply material (10 cm (length)×10 cm (width)) to prepare a preform, and the obtained preform was heated and pressurized at a pressure of 1 MPa and a metal mold surface temperature of 70° C. for 10 minutes by a press molding method in the first process to produce an intermediate with a base material impregnated with a resin. In the second process, the intermediate obtained here was heated and pressurized at a pressure of 0.1 MPa and a metal mold surface temperature of 150° C. with a spacer thickness of 2 mm for 40 minutes by a press molding method in a mold subjected to #800 mirror finishing, thereby producing a flat plate composed of a fiber-reinforced resin. The results of evaluating the obtained fiber-reinforced resin are described in Table 3.

Example 2

Except that the thickness change ratio T in the resin supply material was changed to 2.6 by changing the spacer thickness in the second process to 4 mm, the same procedure as in Example 1 was carried out to produce and evaluate a resin supply material and a fiber-reinforced resin. The process conditions and evaluation results are described in Table 3.

Example 3

Except that the thickness change ratio T in the resin supply material was changed to 5.4 by changing the spacer thickness in the second process to 8 mm, the same procedure as in Example 1 was carried out to produce and evaluate a resin supply material and a fiber-reinforced resin. The process conditions and evaluation results are described in Table 3.

Comparative Example 1

Except that the thickness change ratio T in the resin supply material was changed to 6.8 by changing the spacer thickness in the second process to 10 mm, the same procedure as in Example 1 was carried out to produce and evaluate a resin supply material and a fiber-reinforced resin. The process conditions and evaluation results are described in Table 3.

Comparative Example 2

Except that the thickness change ratio T in the resin supply material was changed to 0.5 by changing the spacer thickness in the second process to 1 mm, the same procedure as in Example 1 was carried out to produce and evaluate a resin supply material and a fiber-reinforced resin. The process conditions and evaluation results are described in Table 3.

Comparative Example 3

Except that the thickness change ratio T in the resin supply material was changed to 0.8 by using as a continuous porous material the continuous porous material (web-2) in place of the continuous porous material (web-1), the same procedure as in Example 1 was carried out to produce and evaluate a resin supply material and a fiber-reinforced resin. The process conditions and evaluation results are described in Table 3.

Comparative Example 4

Except that the thickness change ratio T in the resin supply material was changed to 0.6 by using as a continuous porous material the continuous porous material (web-2) in place of the continuous porous material (web-1), the same procedure as in Comparative Example 2 was carried out to produce and evaluate a resin supply material and a fiber-reinforced resin. The process conditions and evaluation results are described in Table 3.

Comparative Example 5

Except that the thickness change ratio T in the resin supply material was changed to 0.9 by using as a continuous porous material the continuous porous material (web-3) in place of the continuous porous material (web-1), the same procedure as in Example 1 was carried out to produce and evaluate a resin supply material and a fiber-reinforced resin. The process conditions and evaluation results are described in Table 3.

TABLE 3

| | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Resin supply material | | | | | | | | | |
| Continuous porous material | Kind | web-1 | web-1 | web-1 | web-1 | web-1 | Web-2 | Web-2 | web-3 |
| Resin | Kind | epoxy-1 | epoxy-1 | epoxy-1 | epoxy-1 | epoxy-1 | epoxy-1 | epoxy-1 | epoxy-1 |
| Mass content of resin in resin supply material | % by mass | 83 | 83 | 83 | 83 | 83 | 83 | 83 | 83 |
| Thickness of resin supply material | Mm | 1.4 | 1.4 | 1.4 | 1.4 | 1.4 | 1.4 | 1.4 | 1.6 |
| Thickness change ratio (T) in resin supply material | — | 1.2 | 2.6 | 5.4 | 6.8 | 0.5 | 0.8 | 0.6 | 0.9 |
| Variation (Tb) in thickness of resin supply material just after supply of resin to base material | — | 0.01 | 0.01 | 0.01 | 0.01 | 0.01 | 0.24 | 0.24 | 0.16 |
| Variation (Tc) in thicknesses of resin supply material remaining in fiber-reinforced resin | — | 0.01 | 0.03 | 0.08 | 0.18 | 0.32 | 0.20 | 0.22 | 0.61 |
| Method of producing resin supply material | | | | | | | | | |
| Surface temperature of metal mold | ° C. | 70 | 70 | 70 | 70 | 70 | 70 | 70 | 70 |
| Pressure applied by metal mold | MPa | 0.1 | 0.1 | 0.1 | 0.1 | 0.1 | 0.1 | 0.1 | 0.1 |
| Time of pressure application by metal mold | Minutes | 90 | 90 | 90 | 90 | 90 | 90 | 90 | 90 |
| Preform | | | | | | | | | |
| Resin supply material | parts by mass | 100 | 100 | 100 | 100 | 100 | 100 | 100 | 100 |
| Base material | Kind parts by mass | fabric-1 22 | fabric-1 22 | fabric-1 22 | fabric-1 22 | fabric-1 22 | fabric-1 22 | fabric-1 22 | fabric-1 22 |
| Thickness change ratio (T') in base material | — | 1.0 | 1.0 | 0.9 | 1.0 | 0.8 | 1.1 | 0.6 | 1.7 |
| Process of impregnating base material with resin | | | | | | | | | |
| Surface temperature of metal mold | ° C. | 70 | 70 | 70 | 70 | 70 | 70 | 70 | 70 |
| Pressure applied by metal mold | MPa | 1 | 1 | 1 | I | 1 | 1 | 1 | 1 |
| Time of pressure application by metal mold | Minutes | 10 | 10 | 10 | 10 | 10 | 10 | 10 | 10 |
| Process of curing resin | | | | | | | | | |
| Surface temperature of metal mold | ° C. | 150 | 150 | 150 | 150 | 150 | 150 | 150 | 150 |
| Pressure applied by metal mold | MPa | 0.1 | 0.1 | 0.1 | 0.1 | 0.1 | 0.1 | 0.1 | 0.1 |
| Time of pressure application by metal mold | Minutes | 40 | 40 | 40 | 40 | 40 | 40 | 40 | 40 |

TABLE 3-continued

| | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Fiber-reinforced resin | | | | | | | | | |
| Mass content of resin in core layer containing continuous porous material | % by mass | 82 | 82 | 82 | 82 | 82 | 82 | 82 | 81 |
| Mass content of resin in skin layer containing base material | % by mass | 26 | 28 | 24 | 27 | 20 | 27 | 18 | 32 |
| Thickness of fiber-reinforced resin | Mm | 2.0 | 4.0 | 8.0 | 10.0 | 1.0 | 2.0 | 1.0 | 2.0 |
| Unevenness in surface roughness of fiber-reinforced resin | — | good | good | good | bad | fair | bad | fair | bad |
| Sink marks on fiber-reinforced resin | — | good | good | good | fair | bad | bad | bad | bad |

Examples and comparative examples in Table 3 show the following.

Comparison of Examples 1 to 3 to Comparative Examples 1 to 5 shows that when the thickness change ratio T in the resin supply material is controlled to more than 1 and 6 or less, external appearance defects of the resulting fiber-reinforced resin such as unevenness in surface roughness and sink marks, can be considerably reduced.

Comparison of Example 1 to Comparative Examples 3 and 5 shows that when the variation Tb in thickness of the resin supply material just after supply of the resin to the base material is controlled to 0 to 0.1, external appearance defects of the resulting fiber-reinforced resin such as unevenness in surface roughness and sink marks, can be considerably reduced.

Comparison of Example 1 to Comparative Examples 3 and 5 shows that when the variation Tc in thickness of the resin supply material remaining in the resulting fiber-reinforced resin is controlled to 0 to 0.1, external appearance defects of the resulting fiber-reinforced resin such as unevenness in surface roughness and sink marks, can be considerably reduced.

Comparison of Example 1 to Comparative Example 5 shows that when the thickness change ratio T' in the base material is controlled to 0.5 to 1.5, external appearance defects of the resulting fiber-reinforced resin such as unevenness in surface roughness and sink marks, can be considerably reduced.

INDUSTRIAL APPLICABILITY

A resin supply material and a method of producing a fiber-reinforced resin using the resin supply material are suitably used in sport applications, general industrial applications and aerospace applications. More specifically, the general industrial applications include electronic device members and repairing/reinforcing materials such as structural materials and sub-structural materials for automobiles, watercrafts, windmills and so on, roof materials, and cases (housings) for IC trays and notebook personal computers. The aerospace applications include structural materials and sub-structural materials for aircrafts, rockets and artificial satellites.

The invention claimed is:

1. A resin supply material used for press molding or vacuum-pressure molding of a fiber-reinforced resin, the resin supply material in the form of a sheet comprising a continuous porous material and a thermosetting resin, wherein an average pore cross-sectional area ratio P expressed by formula (I) is 1.1 or more:

$$P = AII/AI \quad (I)$$

AI: average pore cross-sectional area in region I
AII: average pore cross-sectional area in region II
Region I: region occupying 10% of total volume of continuous porous material from surface layer on both surfaces thereof
Region II: whole region of continuous porous material.

2. The resin supply material according to claim 1, wherein the continuous porous material has two or more logarithmic differential pore volume peaks of 0.5 cm$^3$/g or more in a logarithmic differential pore volume-pore diameter distribution.

3. The resin supply material according to claim 1, wherein the pore diameter at which the pore volume ratio is 90% or more in the region I of the continuous porous material is 500 μm or less.

4. The resin supply material according to claim 1, wherein the pore diameter at which a logarithmic differential pore volume peak is 0.5 cm$^3$/g or more in the region I of the continuous porous material is 300 μm or less.

5. The resin supply material according to claim 1, wherein the continuous porous material has a porosity of 90% or more.

6. The resin supply material according to claim 1, wherein the volume of the thermosetting resin per unit mass of the continuous porous material is 3 cm$^3$/g or more.

7. The resin supply material according to claim 1, wherein the continuous porous material is a non-woven fabric comprising at least one reinforcing fiber selected from a glass fiber, a carbon fiber, an aramid fiber and a metal fiber.

8. The resin supply material according to claim 1, wherein the continuous porous material is a resin foam.

9. A resin supply material used for molding a fiber-reinforced resin, the resin supply material comprising 1) a continuous porous material comprising a web composed of reinforcing fibers and having a compressive stress of 5 kPa or more at a porosity of 90%, and 2) a resin, wherein a variation M in mass content of the resin in the resin supply material as expressed by formula (II) is 0 to 0.1, and/or a variation D in specific gravity of the resin supply material as expressed by formula (III) is 0 to 0.1;

$$M = Mr/Ma \quad (II)$$

Ma: average of mass contents of resin which are determined from resin supply materials each cut out in a size of 0.1 cm$^3$ Mr: standard deviation of mass contents of resin which are determined from resin supply materials each cut out in a size of 0.1 cm³

$$D=Dr/Da \tag{III}$$

Da: average of specific gravities of resin supply materials each cut out in a size of 0.1 cm³

Dr: standard deviation of specific gravities of pieces resin supply materials each cut out in a size of 0.1 cm³.

10. The resin supply material according to claim 9, wherein the mass content of the resin is 30% by mass to 99.5% by mass.

11. The resin supply material according to claim 9, wherein the continuous porous material is formed of reinforcing fibers.

12. The resin supply material according to claim 11, wherein the reinforcing fiber is at least one selected from a glass fiber, a carbon fiber, an aramid fiber and a metal fiber.

13. A preform formed by laminating and integrating the resin supply material according claim 1 and a base material.

14. The preform according to claim 13, wherein the base material is at least one selected from a fabric base material, a unidirectional base material and a mat base material each composed of reinforcing fibers.

15. The preform according to claim 13, wherein a thickness change ratio T' in the base material as expressed by formula (VII) is of 0.5 to 1.5:

$$T'=T'rt/T'ri \tag{VII}$$

T'ri: average of thicknesses of base material just after supply of resin

T'rt: average of thicknesses of base material remaining in the resulting fiber-reinforced resin.

16. A method of producing a fiber-reinforced resin molded by heating and pressurizing the preform according to claim 13, the method comprising supplying a thermosetting resin or a resin from a resin supply material to a base material.

17. A preform which is formed by laminating and integrating the resin supply material according to claim 9 and a base material.

18. A method for producing a fiber-reinforced resin that is molded by heating and pressurizing the preform according to claim 17, the method comprising supplying a thermosetting resin or a resin from a resin supply material to a base material.

* * * * *